April 11, 1967 S. S. GREEN 3,314,048

RADIO PAGING SYSTEM RESPONSIVE TO PULSES OF CORRECT FREQUENCY AND TIMING

Filed Aug. 31, 1965 4 Sheets-Sheet 1

INVENTOR.

Stanley S. Green

BY

Darbo, Robertson & Vandenburgh

Att'ys.

INVENTOR.
Stanley S. Green
BY
Dacto, Robertson & Vandenburgh
Att'ys.

April 11, 1967 S. S. GREEN 3,314,048

RADIO PAGING SYSTEM RESPONSIVE TO PULSES OF CORRECT FREQUENCY AND TIMING

Filed Aug. 31, 1965 4 Sheets-Sheet 4

INVENTOR.
Stanley S. Green
BY
Darbo, Robertson & Vandenburgh
Attys.

United States Patent Office 3,314,048
Patented Apr. 11, 1967

3,314,048

RADIO PAGING SYSTEM RESPONSIVE TO PULSES OF CORRECT FREQUENCY AND TIMING

Stanley S. Green, 115 E. 61st St., Indianapolis, Ind. 46220

Filed Aug. 31, 1965, Ser. No. 484,074
55 Claims. (Cl. 340—164)

This application is in part a continuation of applications, Ser. No. 125,469 and now abandoned, filed July 20, 1961, and Ser. No. 125,470 and now abandoned, filed July 20, 1961, which in turn were copending with application Ser. No. 682,452 and now abandoned, filed Sept. 6, 1957. The series of applications culminating in the present application has been directed toward opening up an entire new field in the general area of radio paging systems. In this new field the possibilities for heavy traffic and larger numbers of receivers are greatly increased. Nevertheless, the receiving units may be personally portable, or may be carried in the user's pocket. The present disclosure of forms of such a system now preferred is offered for public dissemination in the event that adequate patent protection is granted.

A radio paging system is one in which radio paging receivers are carried by a number of users, any one of whom may be selectively paged by a sending station which transmits a radio signal to which only this user's receiver will respond, thus notifying this one user that he has been paged.

Commercially successful paging systems work on the principle of selectively responding to combinations of audio frequencies transmitted on a radio carrier wave. Such a system has technical limitations and defects on account of which the opening of a new field in this area of paging systems with personally portable receivers is desirable. The new field opened by the present invention is one in which the selective paging is dependent upon variations in timing between a start pulse and one or more paging pulses. Such timed interval paging systems have been proposed before other than in the field of personal portability, but they incorporated characteristics which discouraged any consideration of them for personal portability.

According to the present invention, personal portability is achieved in such a system on a practical basis by using a simple watch movement as the timing media, using a small battery within the pocketable case for certain control functions, and by exercising extreme conservation in using the energy or power available from these sources. The major factors in energy conservation are using the battery only for short pulses, not for maintaining a condition, and using the watch movement for driving a rotary contacting device in a manner which never imposes on the watch movement a more severe torque than that required for driving the contacting device.

In such a system, it is necessary to synchronize the switching device with the sending station at each revolution, i.e., for the start of each timed interval paging operation. In accordance with the principles of maximum energy conservation, this is accomplished by stopping the drive of the contacting device at the end of each revolution and starting it by the starting pulse of the radio signal. The present invention accomplishes the starting and stopping with adequate conservation of energy by either using a "stop-start" clutch or by stopping the clock movement. Either course presents some problems, which are overcome by the present invention. With the stop-start clutch, the battery power must not be used other than for short pulses, lasting only a small fraction of the total cycle. This can be done by using bi-stable clutch-brake means so that a short pulse for snapping this means from its drive condition to its brake condition, or vice versa, is sufficient. No power is used in the clutch-brake during the timing portion of the cycle. In the case of stopping the clock movement, this must be done in such a way that the clock will reliably start when the start signal is received. This is best accomplished by acting directly on the balance wheel of the watch movement. This entails either always stopping the balance wheel in a "wound-up" position from which it will start by itself when released, or using external means for imparting a suitable movement to it when the start signal is received. The former of these two is preferred, and the illustrated form of stop movement gives the watch movement self-stopping characteristics automatically stopping the balance wheel in a wound-up position, the stop being electromagnetically released by a pulse of current when the start signal is received.

Additional objects and advantages will be apparent from the following description and the drawings.

DESIGNATION OF FIGURES

Figure 6:
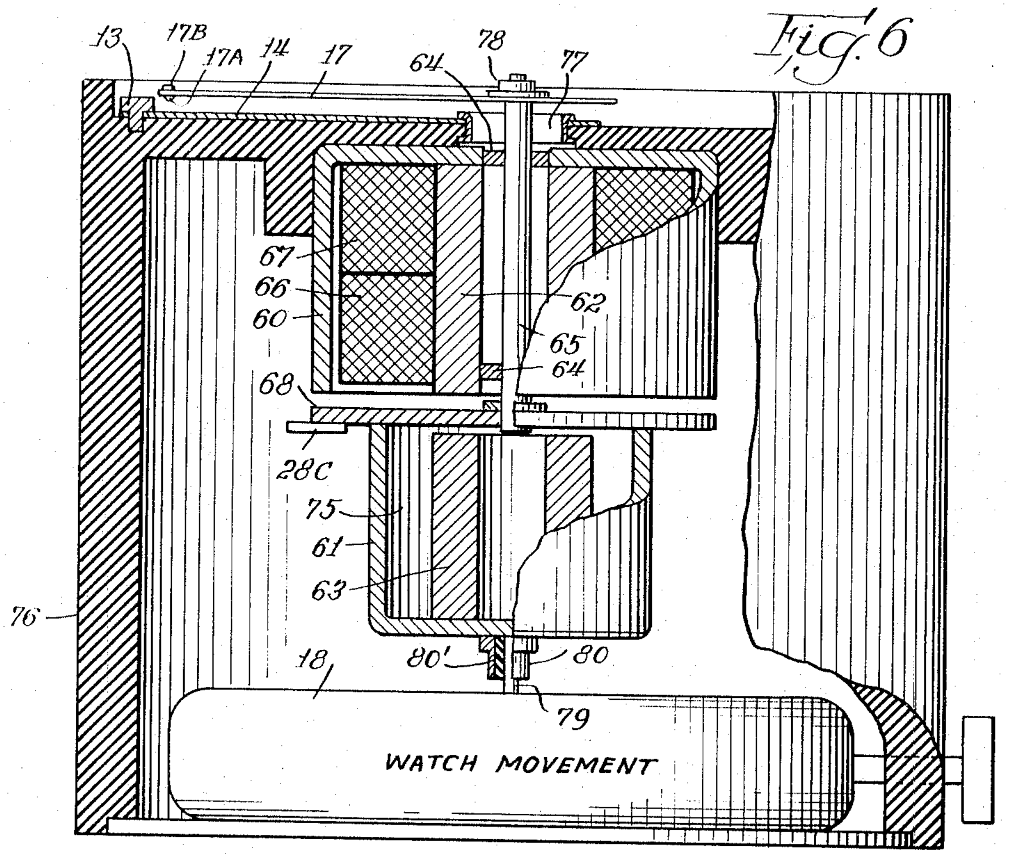
FIGURE 6 is a side view, largely broken away to a diametric section of the clutch-brake and contacting device which, with contacting or circuit variations, may be used with FIGURE 1 or FIGURE 4.
Figures 10, 11, 12:
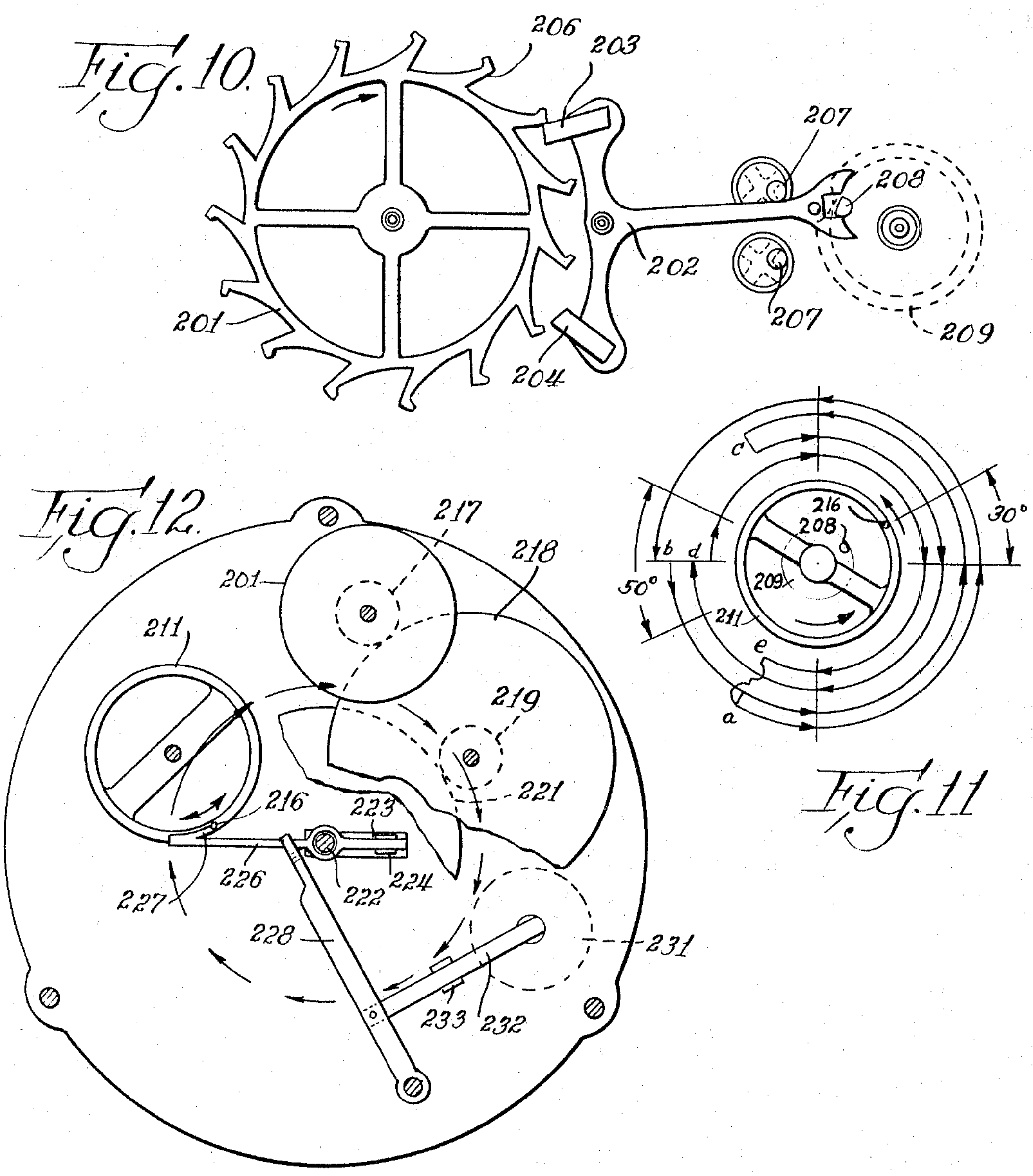
Figure 13:
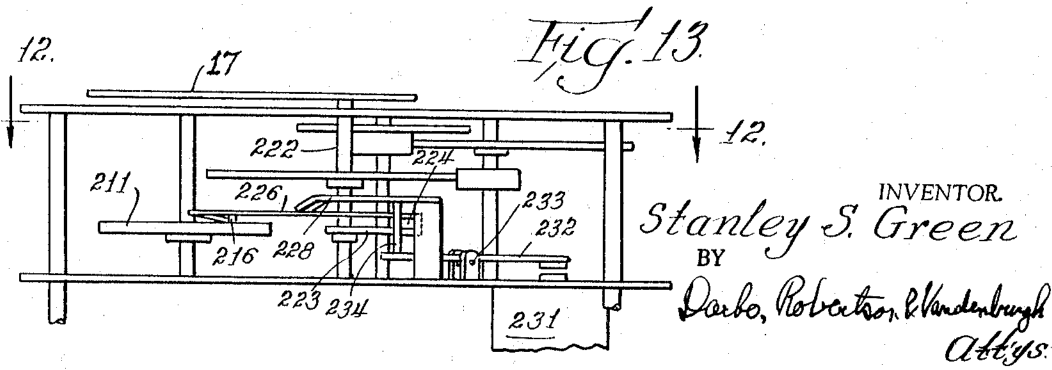

FIGURES 10 to 13 are views relating to a self-stopping watch movement which may be used instead of the clutch-brake of FIGURE 6. FIGURES 12 and 13 being respectively from a plane parallel and a plane perpendicular to the axis of the sweep hand shaft of one form of the invention, and FIGURES 10 and 11 being used in explaining the theory of reliable starting upon release which is utilized in FIGURES 12 and 13.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

GENERAL DESCRIPTION, FIGURES 1 TO 3

To page a person who is one of perhaps a hundred having such paging receivers in their pockets, the number of that desired person is punched on keyboard 91 or 92, associated with contacting device 85 which is driven by a synchronous motor. This causes a paging pulse to be broadcast by antenna 94 during the .6 second or so in the cycle of contactor 85 representing the paged number. This pulse will be picked up by all of the within range receivers 33. Only the receiver having the page number will respond to the pulse received, and cause its signal device 48 to signal its owner that he has been paged. Other receivers which could be responsive to the same frequencies will be excluded by virtue of the fact that at the instant when the signal arrives, there will be no paging contact 13 aligned with their contact-making switch-arms 17. The receiver switch-arms 17 all rotate in synchronism with one another. Being pocketable, this cannot be accomplished by synchronous motor drive, and a wrist watch movement is desirably used. It may be quite inaccurate in terms of error which would accumulate in a day, but is kept essentially synchronus with the sender contactor by being started each minute, or each cycle of the sending contactor, by a synchronizing or starting pulse.

RECEIVER FOR THE ONE-PAGING-PULSE SYSTEM

Figures 1, 2:
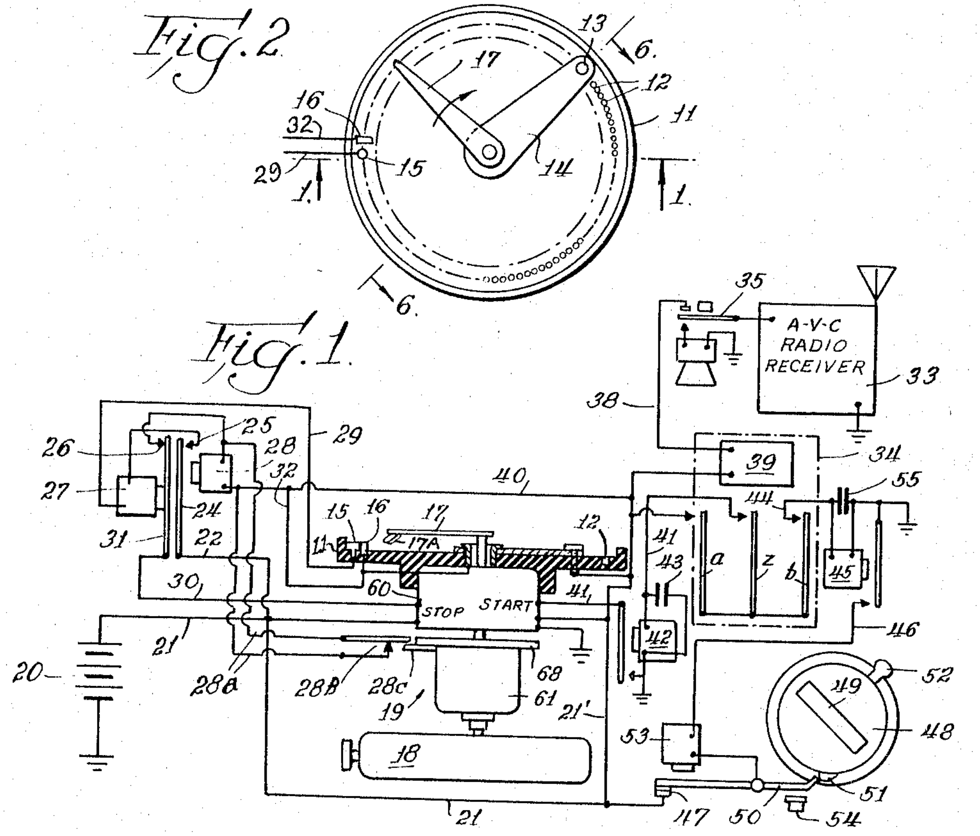
FIGURE 1 is a largely schematic drawing of one form of a pocketable paging receiver embodying the receiver aspects of the present invention.
FIGURE 2 is a plan view of the contacting device of FIGURE 1, also somewhat schematic.

FIGURE 1 which is largely schematic shows the circuitry of the more simplified of the preferred forms of receiver, and should be considered in conjunction with FIGURE 2, which is a view of the switching dial in plan.

A switching dial 11 formed of moulded insulating material contains 100 evenly spaced signal stud holes 12, a few of which are shown and the rest being represented by the broken line circle through their centers. There is a switching stud 13 carried by an adjustable conducting arm 14 which can be positioned at any one of these hole positions. To move it, it is sprung out to lift the shank of stud 13 out of the hole. The switch-arm 17 is driven by a watch movement 18 through a clutch-brake unit 19.

The time during which stud 13 must make contact with brush 17A is related to the needs of the relays connected by them and to the expected clockworks accuracy. Sixty seconds has been chosen as a practical and convenient time for a revolution of the switch-arm 17. There are 102 contact positions on the switch circle. (In addition to the 100-hole positions for stud 13, there are two permanently placed studs on the switching circle: a preparatory stub 15 and a stop-start stud 16.) The time-spacing of the contact centers is therefore .588. If, for convenience, exactly 60 seconds should be chosen as the time for the total cycle including a synchronizing pause, each pulse would be minutely shorter.

Although it may seem amazing that a receiver can accurately select only pulses intended for its when the pulses come at such high frequency, the nominal .6 second allows for considerably more inaccuracy than is expected in good watch movements.

*Stopping the switch-arm*

What happens during a switching cycle is best seen by starting with the switch-arm in the position after it has passed stud 13. As it moves clockwise it first contacts preparatory stud 15. A circuit is thereby completed which prepares the receiver to stop the switch hand when it encounters stop-start stud 16. This preparatory circuit goes from the ungrounded side of battery 20 through leads 21 and 22 to armature contact 24 of a bi-stable relay, through contact 25 (which at the moment is closed), through electromagnet 27, through lead 29, stud 15, switch-arm 17 and its shaft to ground and the battery. Electromagnet 27 attracts the armature to close the contacts 26 (opening contact 25) and the circuit is now prepared for stopping the switch-arm.

When switch-arm 17 makes contact with stop-start stud 16 it causes stopping as follows: current flows from the battery through lead 21 to one of the stop terminals of the clutch 19 for coil 66 (FIG. 6). From the other of these terminals it flows through lead 30, lead 31, contact 26, shunt contacts **28*b* (and when they open, through electromagnet 28, changing the pivoted armature 24 to its initial position to interrupt the stopping current), and lead 32 to stop-start stud 16, switch-arm 17 and ground to the battery. Coil 66 draws armature 68 away from driven unit 61 and against stationary unit 60, thus stopping switch-arm 17**.

It is important for contacts 26 not to open until the stop coil of the clutch has moved the armature 68 so that it is sure to completely stop the swith-arm 17. This is ensured by a pair of leads **28*a* and a contact 28*b* which short-circuits the relay coil 28 until the clutch armature 68** is about to seat firmly in its upper or stop position.

When switch-arm 17 reaches the stop-start stud 16 it is necessary to cause this stop to occur approximately (as precisely as practical) at a desired spot on the stud, to ensure the proper timing of engagement with paging contact 13 during the paging cycle. This is accomplished by proper design location of the approach edge of stud 16.

The receiver is now in a condition for the switch-arm to be started again after a suitable synchronizing interval. This interval can be anything desired, but .6 second, the same as for a switching interval, is ample.

*Starting the switch-arm*

The starting pulse, and later a selective signal pulse, come from radio receiver 33, and actuates a three reed relay 34. Each pulse lasts a nominal .6 second. One side of the radio output is connected to the ground. Unless button 36 has been pressed to actuate switch 35 to connect speaker 37, the other side of radio output is connected through lead 38, exciting coil 39 of relay 34, through leads 40 and 32, idle now, stationary stop-start stud 16, and contact arm 17 to ground. The radio receiver is of the automatic volume control type so that its output signals will be as uniform as possible.

In the receiver of FIG. 1 the three reeds *a*, *b* and *z* of the relay 34 are tuned respectively to respond to audio frequencies *a*, *b* and *z*. To guard against false signals, two of them must be actuated simultaneously to close a circuit. The starting pulse broadcast by the sending station includes audio frequencies *a* and *z*, so that reeds *a* and *z* will be vibrated to close their contacts. The start current then goes from the battery 20 through leads 21, 21′, reed *a*, the through reed *z* and then via lead 41 through an auxiliary relay 42 and to ground. For the duration of the start pulse, the relay 42 connects the start terminals of the clutch 19 across the battery via leads 21′ and 41. As described below, the start pulse shifts clutch-brake disc 68 away from shell 60 and into engagement with shell 61 which is constantly driven by watch movement 18.

Reeds *a* and *z* vibrate at different frequencies and the current through the two, although unidirectional, tends to pulsate at the beat frequency. A capacitor 43 is placed across the terminals of relay 42 to smooth this out.

*Single pulse selection*

After the start, the switch-arm 17 proceeds to make a complete revolution with accurate timing provided by watch movement 18. If a .6-second signal pulse, having the superimposed audio frequencies *a*, *b*, is broadcast on the radio frequency of receiver 35, the following will take place:

Current will flow from battery 20 through leads 21, 21′, through reed *a* through reed *b*, thence through lead 44 to a relay 45 (desirably having a capacitor 55 across it) and to ground. This closes a circuit from ground, through the contacts of relay 45, through lead 46, through a trip coil 53 of an alarm buzzer 48, through trip lever 50, through contacts 47, leads 21′ and 21 to the ungrounded side of the battery. Lever 50 is bi-stable.

THE ALERT DEVICE

Referring to FIG. 1, a spring buzzer mechanism 48 is the preferred form of signal for informing a user he has been paged. It may have an interior spring which is wound up by handle 49. A pawl on lever 50 acts against notched wheel 51 to keep the buzzer from unwinding and operating the clapper 52. The lever 50 acts as an armature for the buzzer release electromagnet 53. The lever is made bi-stable for on and off buzzer positions by any suitable means. Contacts 47 open the circuit as soon as the buzzer is actuated and lever 50 must be reset by a button 54 to stop the buzzer.

It may seem primitive to suggest an old-fashioned spring-driven buzzer for this function in the pocket receiver but there is one good reason. Many of the receivers will be left unattended at times by their owners. In the case of a paging call coming in under these conditions the alarm would *not* be turned off, and the battery would be run down. In contrast, the buzzer merely unwinds without doing any damage. The cost of a buzzer must also be compared with the cost of a speaker and transistor circuitry to do the same job. Buzzers are very common, and some are compact enough to be included in some high grade wrist watches. For these reasons no details are given as to the buzzer and it is shown in FIG. 1 in schematic form.

THE CLUTCH

The clutch-brake unit 19 makes it possible to use a watch movement without any modification which is a cost advantage. A modified form of the invention does away with the clutch-brake by a modification of the watch movement. The manufacturer can take his choice.

The clutch assembly, watch, switch-hand and the tributary parts are shown in FIG. 6 which is partly in section. The principal parts are to approximate scale. The whole drawing is five times actual size.

This magnetic clutch is unique in that it is self-holding (requiring no outside pressure) in either of its two position, it operates instantly with only a momentary pulse of current and is unaffected by vibration or temperature change.

Upper and lower magnets are formed respectively with circular shells of soft iron 60 and 61 and central cylindrical magnet cores 62 and 63. The core 62 has a hole passing through it axially and is made of a mild coercive material such as 1% carbon steel which has a coercive force of only 48 oersteds with a residual induction of about 8600 gausses. It supports two bronze bearings 64 in which a shaft 65 rotates. The upper magnet is an electromagnet and has two coils 66 and 67 for magnetizing and demagnetizing respectively. A soft iron disc armature 68 completes the magnetic circuit.

Magnet 63 is a permanent magnet made from one of the very high coercive magnetic materials, preferably by molding.

The circular armature 68 serves as the armature for a lower permanent magnet assembly 61 as well as for the upper electromagnet assembly 60. It will be shown later that the clock movement moves forward in rapid but minute jerks. With a small or weak clock movement, the moment of inertia of the part which must rotate may become important. For this reason, disc 68 can be made very thin (or if it is desired to go to extremes) instead of being a disc, it can be a narrow strip which is attracted alternately to either the upper electromagnet assembly 60 or the lower permanent magnet assembly 61. Since the lower permanent magnet assembly 61 must also rotate continuously with the watch movement and should have a low moment of inertia, it, too, is made as light as possible with a much smaller diameter than the upper electromagnet assembly 60 which is stationary all the time. Indeed, if necessary, most of the outer cylindrical shell of permanent magnet assembly 61 can be stripped away to make it in the form of a yoke which would match in width at its outer tips the reduced dimensions of a strip type armature 68. This is possible because the armature assembly 68 together with the shaft which carries it and the switch-hand on this shaft, all stop at the same place each time at the end of a switching revolution. In the drawing the armature is shown in a position attracted to the permanent magnet assembly 61 and therefore in a position to be driven by the watch movement.

As seen in FIG. 6, a stainless steel shaft 65 of very small diameter passes through the center of unit 60. It turns freely in two bearings 64 and also slides freely in an axial direction in these bearings as the armature 68 slightly moves up or down to engage either the lower permanent magnet assembly or the upper electromagnet assembly. These bearings can be of bronze or graphite or other conductive bearing material.

Arm 28C is fastened to or formed on armature 68 in any convenient way at an angular position to be in operative alignment with switch 28B, shown in FIG. 1, when the switch arm 17 is in its stop position.

The entire clutch assembly is contained in a moulded plastic cylinder 76. The round upper surface of housing 76 provides the switching face and has moulded into it the holes for positioning the switching stud 13 which can be moved to any selected and numbered hole. Stud 13 is shown in section with the adjustable connecting arm 14 which carries it. This arm is angularly adjustable about a sleeve 77, connected in the circuitry.

Switch-arm 17 is shown in profile mounted at the end of shaft 65 and held in place by collar 78. It is shown in a position just after it has passed stud 13 and it has a small rounded and polished gold tip 17A on it. This makes contact with a polished and gold-plated surface of stud 13. This provides a wiping contact which is infallible no matter how light the contact pressure. The thickness of switch-arm 17 can be made anything desired to provide a sufficiently light contact to cause negligible interference with the driving force of the watch movement. This latter point has been verified by experiment with small wrist watches. Some slight pressure adjustment of switch-arm 17 with respect to the contact studs may be necessary. This can be done in several ways during assembly and it has not been necessary to complicate the drawing with such means. Similarly slight structural changes can be made in the clutch parts for the sake of compactness or manufacturing convenience.

The slight movement upward of the aramture-shaft and switch-arm assembly when the stop takes place, may be sufficient to break the contact of a gold projection 17A on the switch-arm with the surface of stop-start stud 16. If avoiding this reliably proves difficult, another pair of contacts similar to contacts 28*b* may be operated by arm 28*c*, as armature 68 is raised, to prepare the start circuit independently of stud 16.

The lower permanent magnet assembly may be tightly fastened to the second hand shaft 79 of the watch movement 18 by collar 80. Until experience shows that the inertia of yoke 61 causes no trouble in the watch movement, rubber torque bushing 80' is preferred.

The soft iron cup 60, and cup or yoke 61, surrounding or forming return paths for each of the clutch magnets, protect the watch completely from their local magnetic effects.

If it is assumed that there is no magnetism in the upper electromagnet assembly, the lower assembly will pull the armature 68 until it is in contact with the rim of shell 61 and the clutch will be tightly engaged so that the watch is driving the switch-arm.

If a strong pulse of battery current is now applied to the stop coils 66 in the upper electromagnet assembly, it will pull the armature 68 upwards with a force to overcome the permanent magnet assembly. The assembly of the disc armature and the shaft will now be tightly anchored by the armature disc 68 pressing against the rim of soft iron shell 60.

Core 62 of the electromagnet retains some magnetism so that the actuating pulse does not have to continue in order to hold the clutch in place in the locking position. A moderate pulse from the battery in the second of its oppositely connected coils will completely demagnetize core 62, or reduce its residual flux to zero, and cause the constantly-pulling permanent magnet assembly below to take over and snap the armatures back into engagement for rotation by the watch.

Figure 7:
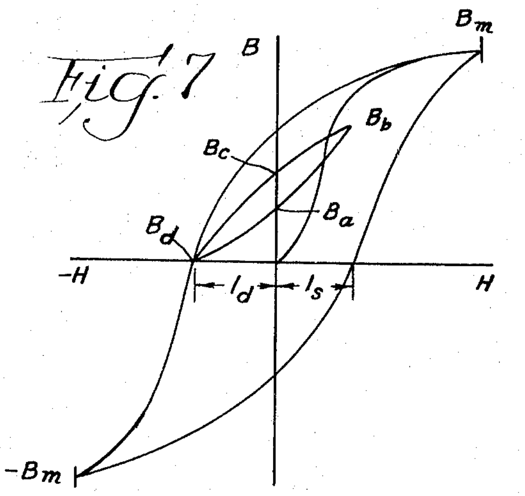
FIGURE 7 is a hysteresis curve used for explaining the clutch-brake of FIGURE 6.

FIG. 7 shows a typical hysteresis loop of 1% carbon steel and the displaced or inner hysteresis loop on or near which the central core 62 operates. The complete hysteresis curve, symmetrical in opposite directions, is the outer loop extending from $-B_m$ to $B_m$. The smaller displaced or inner hysteresis curve lies within it approximately as shown, extending from $B_d$ to $B_b$. Action can be understood by considering a cycle of operation beginning with the armature disc in the position where it is in contact with the rim of shell 61. In this condition the switch-hand is rotating and no current is being applied to either coil in the electromagnet assembly. The M.M.F. in the gap and shell 60 may be assumed to be zero for practical purposes, and for discussion. At least the flux in the electromagnet is too low to draw armature 68 from the permanent magnet assembly, in view of the gap width existing at this time above aramture 68. Now a "stop" current is applied to the coil 66 when the sweep-hand 17 engages contact 15. This raises the flux to a value high enough to overcome the permanent magnet pull so that the clutch-brake armature 68 snaps up and adheres to the upper electromagnet, the flux at this time rising to $B_b$. The M.M.F. represented by the applied stopping current $I_s$ to the coil does not last, but drops to zero, and when this occurs the flux drops to the value $B_c$. This is more than sufficient to retain the contact between the electromagnet and its armature since its gap is now zero and the gap below disc 68 is large. In the next step demagnetizing current $I_d$ is applied to start coil 67. It reduces the flux in the circuit to zero, causing the lower permanent magnet to take over and close the clutch again. This demagnetizing current does not last, but when it is discontinued, the gap between the electromagnet and its disc armature has so lengthened that the residual magnetism (less than $B_a$ because of the gap) is powerless to pull it back.

The gap in the permanent magnet circuit never completely closes because the core 63 is somewhat shorter than the sides of the cup 61. A high coercive magnetic material will overcome this gap and at the same time the gap prevents a very strong lock-in which would occur if complete contact were allowed. In other words, a fairly gentle force-distance gradient is provided in the permanent magnet circuit in its most closed condition to make it easier for the upper electromagnet to take over when the time for a stop action arrives. The number of turns on the stop coil 66 in the electromagnet can be chosen to provide any necessary value flux to prevail over the lower permanent magnet.

The strength of the permanent magnet can be very accurately adjusted by original design and a selected partial demagnetization, and will remain constant regardless of vibration, aging or temperature changes.

To prepare the brake magnet circuit 60, 62 to operate on or near inner hysteresis loop $B_b$ to $B_d$, a heavier current is put through coil 66 (possibly reinforced by coil 67 connected especially for this purpose) to saturate the core 62, taking it to the point $B_m$. A flash current is enough. The usual demagnetizing current through coil 67 will then carry the flux to $B_d$, and operation is henceforth as already described.

SENDING STATION FOR SINGLE PAGING-PULSE SYSTEM

Figure 3:
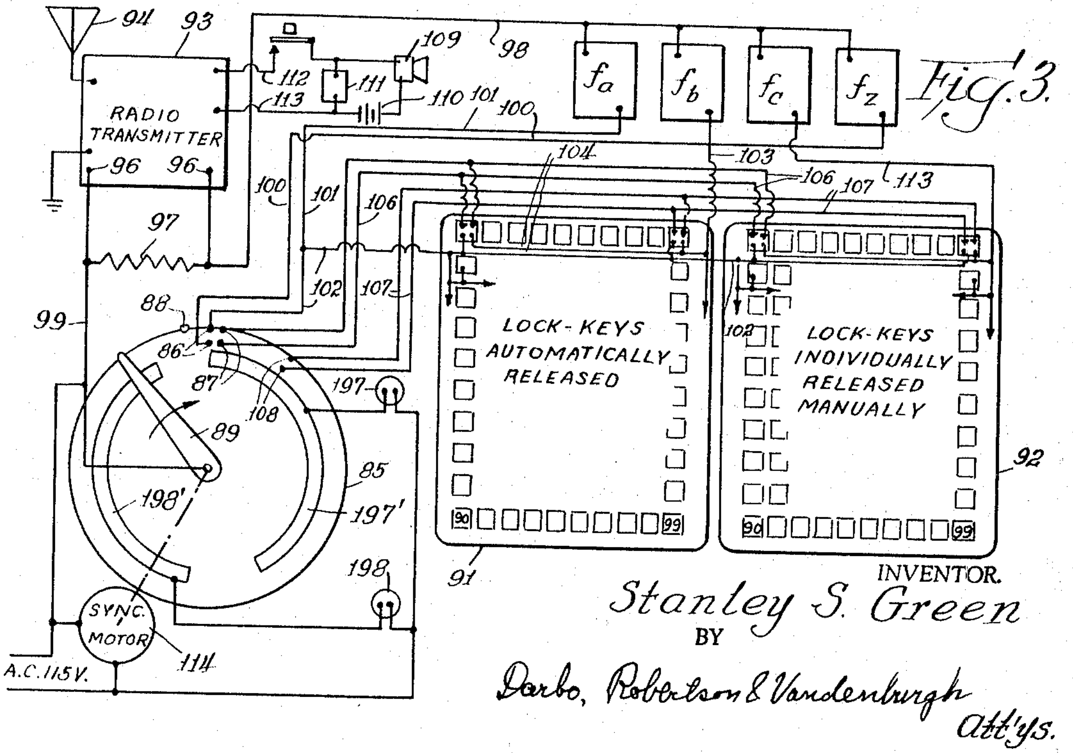
FIGURE 3 is a schematic drawing of a sending station suitable for paging any one of numerous receivers of the FIGURE 1 type.

FIG. 3 shows the circuitry and elements for sending the pulses to operate a system of paging receivers such as shown in FIG. 1. A switching circle 85 has a pair of start studs 86, followed by a series of pairs of paging signal studs spaced around it from an initial pair of studs 87 representing call zero to a final pair of studs 88 representing call 99. The studs 86 to 88 are equidistant on the circle and are contacted by a switch-arm 89 driven in a clockwise direction by a small synchronous timing motor. The width of the contacting portion on the switch-arm and the diameter of the studs is chosen so that a pulse of .588 second duration (.6 nominal) is generated as the switch-arm passes each stud. The gearing of the synchronous motor is such that it takes 58.8 seconds for the switch-arm to pass by the 100 studs. The pair of twin studs 86 act to produce a *start* pulse. There is a time interval in the clockwise distance on the switching circle between the final signal studs 88 (call 99) and start studs 86 of 1.8 seconds. This is consumed by the synchronizing pause of .6 second, the time required for the preparatory stud in the receiver which is also .6 second and .6 second for traversing the start-stop stud in the receiver.

FIG. 3 shows the arrangement for 200 code calls and is illustrative of anything from 100 calls, using only 3 audio frequencies, to 700 calls which would use nine audio frequencies and have 7 keyboards of 100 keys each. In FIG. 3 only four audio frequencies are used with two keyboard assemblies 91 and 92. Both control radio transmitter 93, sending signals by antenna 94 and ground.

*Keyboards*

Structural details for the keyboard assembly are left to routine design. These keys need not be operated frequently or rapidly as in a typewriter, and, they can be positioned fairly close together. Thus, one entire keyboard occupies a space less than 6⅓ inches square. There is room for several of these on any desk top. Each key, when pressed, closes a simple two-pole switch. The keys are lock-keys, meaning that each one pressed stays down. When released, it springs up, and opens the contacts. The release can be automatic or can be accomplished manually, as by pulling forward slightly on the key, or one keyboard can be of each type, as illustrated. An advantage of the single paging pulse system is that a key can be left down all day, or until the paged person calls in. Some users may prefer automatic release so as to know if there is a second call.

*Frequency current supplies*

FIG. 3 shows four current supplies $f_a$, $f_b$, $f_c$ and $f_z$ supplying currents at audio frequencies *a, b, c* and *z*, respectively. The currents are all of the same magnitude which may be any convenient value. The voltages of these currents can be any convenient value. The currents of the selected frequencies flow through bus 98, through resistance 97 and lead 99 to switch-arm 89 and thence to various studs on the switching circle, depending on their leads and the keyboard contacts, back to the respective current supplies $f_a$ to $f_z$. The resistance 97 is connected across the terminals 96 of the modulation circuit of radio sender 93, so that the potential drop across resistance 97 is the signal input to the radio transmitter.

A lead 100 runs from current source $f_z$ to one of the twin start studs 86. Another lead 101 runs from current source $f_a$ to the other of twin studs 86. This means that every time switch-hand 89 passes the start position, a current pulse of frequencies *a, z* is passed through resistance 97.

Keyboard 91 has all the keys for the frequency combination *a, b,* derived from $f_a$ to $f_b$. Leads 101 and 102 from current source $f_a$ and lead 103 from current source $f_b$ go to this keyboard and form a pair 104 and as indicated by the arrows serve all the keys in this 100 call assembly of keyboard 91.

The switching scheme is shown for representative keys 0 and 9 in both keyboards 91 and 92. Lead pair 106 from keys 0 in each keyboard goes to stud pair 87 which is for call number 0. Lead pair 107 from keys 9 in each keyboard goes to stud pair 108 which is for call number 9. When pressed these keys will signal their respective calls. In an analogous way, leads 102 and 113 serve keyboard 92 with $f_a$ and $f_c$. The same lead pairs 106 and 107 lead to the stud pairs 87 and 108.

A microphone 109 which may be served by a battery 110 is connected to the radio transmitter modulation terminals by leads 112 and 113. A filter 111 shorts out or by-passes any output of the microphone 109 which has a frequency $f_a$. This makes it impossible for the conversation on the system to trigger any signal calls or any starts of switching cycles since all of these require an $f_a$ component in the pulse.

*Homologous calls*

When two homologous calls (from separate keyboards) are sent at the same time, as for example by pressing key 9 on each of the keyboards 91 and 92, there is contained in the modulating potential across resistance 97, a total of three different frequencies: $f_a$, $f_b$ and $f_c$. For three homologous calls (which could occur with more keyboards provided) there would be a total of four frequencies contained in the modulating potential.

SYNCHRONOUS MOTOR DRIVE

Figures 5, 5A:
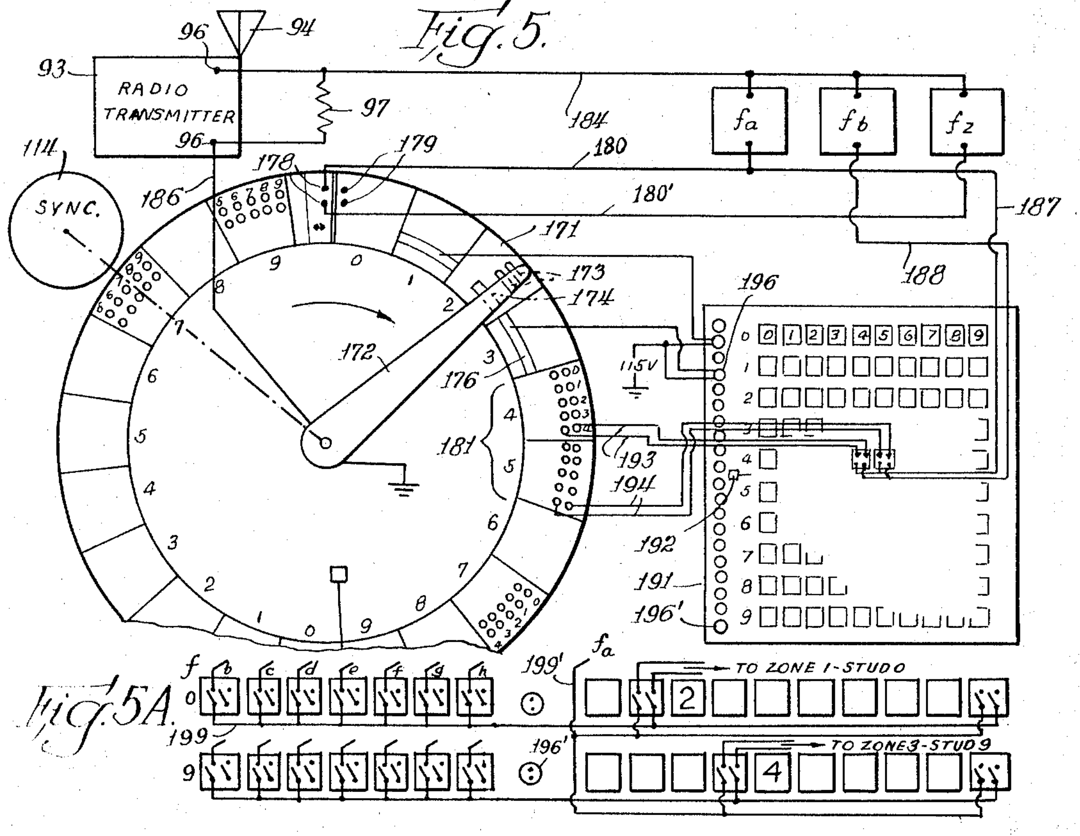
FIGURE 5A is a schematic view illustrating a modified sending station.

Not much power is needed to drive the switch-hand in the sending set of FIG. 3 or FIG. 5. Therefore a small ordinary synchronous timing motor 114 will do. The one recommended (although there are others of about equivalent merit) is the Haydon, Series MP–10 heavy duty inductor motor. It is manufactured by the Haydon Division of the General Time Corporation, Torrington, Conn. Although it weighs only a few ounces, this motor has a guaranteed torque of 30 inch-ounces at 1 r.p.m. and an unlimited life. This is far more than the amount necessary to rotate the switch-arm.

RECEIVER FOR THE TWO PAGING-PULSE SYSTEM

Figure 4:
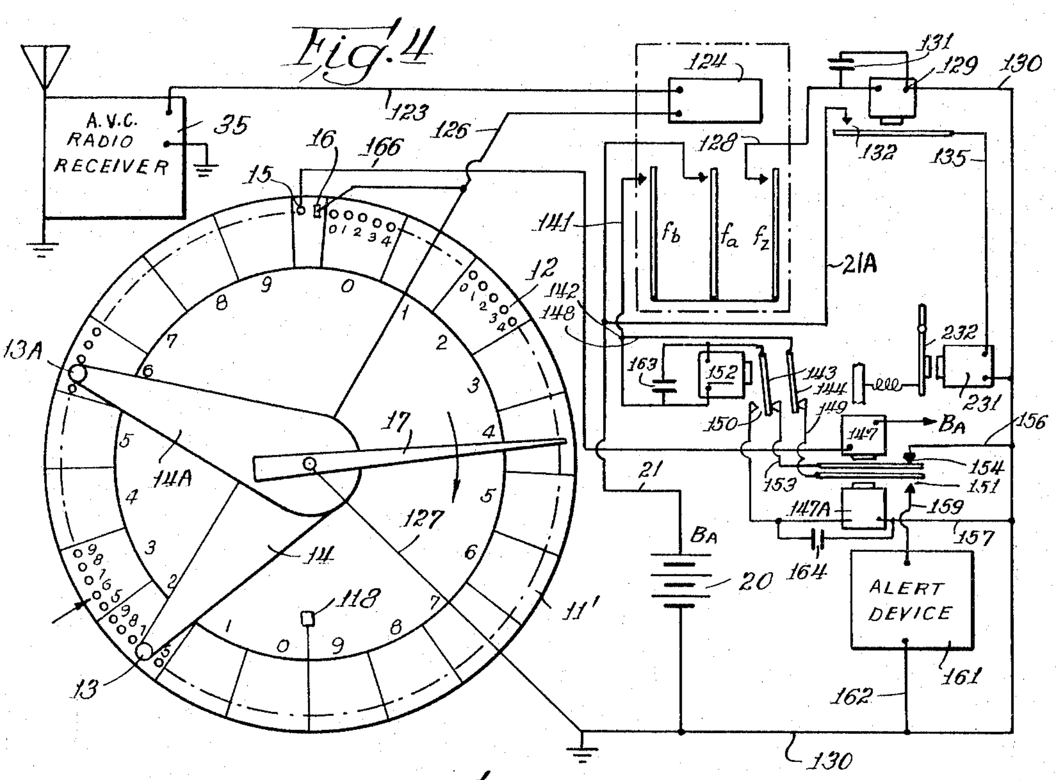
FIGURES 4 and 5 are schematic views of receiver and sender, respectively, of another embodiment of the invention.

By minor changes, the receiver of FIGS. 1, 2 and 6 to 9 may be made suitable for a much larger number of users, two paging-pulses instead of one being required for each page call. The changes required are indicated in FIG. 4, and the corresponding sender in FIG. 5.

Again there are 100 signal studs in this receiver, but they are used in ten groups, each such group having ten studs. Using one group, alone, with two digits (corresponding to two pulses) in each group there are 45 calls as follows:

| | | | | | | | | |
|---|---|---|---|---|---|---|---|---|
| 01 | 12 | 23 | 34 | 45 | 56 | 67 | 78 | 89 |
| 02 | 13 | 24 | 35 | 46 | 57 | 68 | 79 | |
| 03 | 14 | 25 | 36 | 47 | 58 | 69 | | |
| 04 | 15 | 26 | 37 | 48 | 59 | | | |
| 05 | 16 | 27 | 38 | 49 | | | | |
| 06 | 17 | 28 | 39 | | | | | |
| 07 | 18 | 29 | | | | | | |
| 08 | 19 | | | | | | | |
| 09 | | | | | | | | |

Total=45 (for one digit-set).

The groups are use independently of one another. The reason is to permit several paging calls within one minute. To understand the need for independent groups, assume a decade of stud positions represented by the digits 0 1 2 3 4 5 6 7 8 9. One code call could be made by pulses on studs 2 and 8. If, however, it were tried to send the code call 35 at the same time, calls 28 and 35 would be sent but there would also be generated the unwanted or spurious calls 23, 25 and 38.

There are 450 calls for all ten groups. With only 45 distinct call numbers per group, the occasions when there will be a desire for two calls simultaneously in any group for a given minute comprising a switching cycle will be rare. This means an excellent traffic capacity as compared with existing paging systems.

*Stud grouping*

In FIG. 4 the components and circuitry of a two-pulse receiver are shown. A switching dial 11′ contains 100 positioning holes 12 for two signal studs 13 and 13A. As was the case for the one pulse receiver, these studs subtend a time-distance on the switching circle determined mainly by relay-response times (to be discussed below). These studs are mounted on adjustable conducting arms 14 and 14A. The possible stud positions (as determined by the holes) are arranged in 20 zones of five positions each. A mark 118 separates two groups of 10 zones each at the lower side of the switching circle. A reset stud 15 and the stop-start stud 16 separates the two groups of 10 zones on the top side of the switching circle.

Considering only the right-hand side of the switching circle there are zones 0 to 9 each zone of which represents a corresponding digit contained in a horizontal row of ten keys in a sending keyboard. Pressing one key in each of two rows can provide pulses for the last two digits of a three-digit call.

Each one of these zones contains holes for five stud positions. Each one of these positions (numbered with the small figures 0 through 4) represents the number of a horizontal row of ten keys on the sending keyboard.

The same arrangement scheme holds for the left-hand side of the switching circle. The two signal studs 13 and 13A are set in zones 2 and 6, respectively. Therefore, the last two digits of the call for this receiver is 26. Each one of the two signal studs is set in hole position 6 of the zone. Therefore, the call is in horizontal decade row 6 on the sending station keyboard and the entire code call which this receiver is set to receive is 626.

An extremely important result of the above arrangement of switching stud positions is that under no conditions are pulses to be handled by the receiver closer together than 3 seconds (5×.6 second of pulse time). As an example of this, call 623 (involving adjacent zones 2 and 3) would require that stud 13A be in zone 3 but its position in this zone will be at row 6 (marked by an arrow) which is 5 spaces away from the same row 6 position in zone 2.

This arrangement may be called interspersing of groups. Its purpose is to provide ample recovery time or decay time for the vibrator reeds between any and all possible pulses received, which makes it possible to use vibrating reeds in such a multi-pulse system in which the sender may send impulses (for different calls) with no time between them. Without interspersing, but the contacts of one group arranged all in succession, signals for some calls would be received from two adjacent stud positions, and in that event the time interval between pulses is entirely too small for a vibrating relay to differentiate between them. Even with interspersed groups, the reed relays must not be subjected to every pulse transmitted, but only to those coinciding with the positions of studs 13 and 13A. Hence, as we shall see below, the output from the radio receiver reaches the relays only after being first handled through the switching studs.

Theh results would flow even if all ten groups were interspersed together. The illustrated separation of interspersed groups 5 to 9 from interspersed groups 0–4 has a still further advantage, in that complete calls can be made in the right-hand half of the receiver (groups 9 through 4) while the left-hand side of receivers (groups 5 through 9) are inactive. With continuous rotation of the switch-arm in the sending set, this enables a series of calls to be punched into the top five rows of the keyboard at one time and into the bottom five rows at another time. This allows substantially continuous calling with little time delay or waiting. Further discussion of this feature will follow in connection with the two-pulse sending set.

*Circuitry (FIGURE 4)*

Although the stop and start circuitry could be the same as in FIG. 1, it has been illustrated as appropriate for a self-stopping watch. At the end of every revolution of the switch-arm it is stopped by the watch movement described below at a predetermined position on the stop-start stud 16. Description of a cycle of operation is best taken from here.

The circuit for audio frequency output pulses extends from the ungrounded side of the radio receiver 35 along lead 123 to the exciting coil 124, of a three-reed vibrating relay responding to frequencies *a*, *b* and *z*. From relay 124 it extends by way of lead 126 to starting stud 16 and through adjustable connecting arms 14 and 14A (which are in contact with each other, as through a collar such as 77 of FIG. 6), from them to paging studs 13 and 13A. Considering the starting pulse first, the path of the pulse continues from stud 16 through switch-arm 17 (which would have been stopped on stud 16) and to ground through lead 127.

The starting pulse will contain the frequencies *a* and *z*. The path of the current to start the switch-hand begins at the underground side $B_A$ of battery 20 and flows through lead 21, through the intermittent contact at reed $f_a$, through the intermittent contact at reed $f_z$, through lead 128 to relay 129 and to ground bus 130. This relay stays closed only while the pulse lasts. It desirably has a capacitor 131 across its terminals. When relay 129 is closed it completes a circuit through its contacts 132 as follows: Current from the high side of battery 20 flows through its lead 21 and 21A, contacts 132 and lead 135 to the watch trip coil 231 and 130 to battery. As described below, coil 231 actuates trip lever 232 to start the clockworks and switch-arm 17.

Contact 132, or another contact on the same relay, could also close a known type of clock-winding circuit for watch 18. In receivers for personal portability it may be preferred to do all spring winding manually for maximum life from a small battery. It is observed, however, that some features of this invention are useful in paging receivers where personal portability may not be wanted.

*Adding two signal pulses*

If a particular receiver is paged, then each of the two paging pulses (both containing $f_a$ and $f_b$) actuates the vibrating relay exciting coil 124 because each is received at the instant that the switching arm 17 engages studs 13 or 13A, positioned corresponding to the code setting of a particular receiver. When coil 124 is excited, it causes current to flow as follows: from the high side of battery 20 along lead 21 through the contact at reed $f_a$, through the contact at reed $f_b$ and thence through lead 141 to a junction point 142. The pulses arriving at junction point 142 may be somewhat variable in duration. Therefore provision must be made to be sensitive to short pulses and nevertheless prevent an overlong pulse from having the same effect as two short ones. This is because the circuitry from junction point 142 must be capable of distinguishing and adding two pulses where two are required to effect an alert.

To accomplish this addition two relays are used. One has electromagnet 152 and contacts 144 and 150. Contacts 144 stay closed at all times except when electromagnet 152 is excited. The other is a bi-stable relay having a pivoted armature 146 with two exciting electromagnets 147 and 147A. If all pulses were of the same strength and duration, a simpler single relay could be used. On the conservative assumption that they will not be, the arrangement shown is given.

Operation from junction point 142 is as follows: current tries to flow along lead 148 through contacts 144, lead 149, along the armature 146 and to contacts 151. From here it can go no further as an initial (or reset) position of this armature after any signal cycle is always in the upper position with contacts 151 open. The pulse is therefore forced to flow through the alternate path from junction 142 which is through relay 152, through back contacts 143 of relay 152, lead 153, through contacts 154 (which are closed because of the armature being in the upper position) from there through lead 156, to ground bus 130. Relay 152 opens contacts 144 and holds them open as long as the pulse lasts. It also shifts its own circuit from back contacts 143 to front (make before break) contacts 150 energizing relay 147A. This shifts bi-stable armature 146 to its lower position, which opens contacts 154 and closes contacts 151. However, no matter how long this initial pulse lasts, none of it can flow through contacts 151 because contacts 144 have been open and will stay open until this first pulse ends.

The second pulse cannot operate relay 152 because contacts 154 are open. Instead, it flows through lead 148, contacts 144, lead 149, contacts 151, lead 159 and to the alert device 161, lead 162 and to ground bus 130. Capacitors 163 and 164 are desirably shunted across electromagnets 152 and 147A for smoothing out the unidirectional current pulsating at the beat frequency between $f_a$ and $f_b$. An alert device such as that described in the one pulse receiver can be used.

After an alert signal has been given during any switching cycle, it is necessary to return bi-stable armature 146 to its upper initial position. This is done automatically at the end of each cycle as follows: as switch-arm 17 rotates past a reset stud 15 at the end of the cycle, it completes a reset current which flows along lead 166 to electromagnet 147 and hence (as shown by the arrow to $B_A$ of the battery 20). This pulls up the armature 146 into an initial position in case a signal has been received in the last cycle which has left it in the lower position. Thus, preparation is made for a new cycle all over again. The time-distance on the switching circle occupied by the reset stud can be considerably less (say half) of the other studs.

TWO PULSE SENDING STATION

The zone and switching arrangement in the sending station of FIG. 5 is analogous to that in the two pulse receiver of FIG. 4. There is a switching circle 171 with an array of twin switching studs throughout its circumference. Typical studs are drawn in for the two zones 7. A switch-arm 172 has on it brushes 173 and 174. Brush 173 (which may be two separate spring contacts) makes contact with all studs in a revolution and is of such width (along the switching circle) that the pulse sent out lasts for .588 second. The switch circle is divided into 20 zones. On the right-hand of the circle these are indicated as 0 to 9 and on the left-hand of the circle the same notation exists. Brush 174 makes contact with a representative zone segment 176 for the purpose of operating a zone signal light to be discussed in connection with the keyboard. This is a small NE–51 General Electric glow lamp. There are other such segments (although not drawn in) for each zone.

178 is a pair of start studs while 179 indicates the first stud pair in the first zone and 22 the last stud pair in the last zone.

In the right-hand array of studs, marked off by the bracket indicator 181 the five studs in each separate zone are labeled 0 through 4. These numbers correspond to horizontal decade rows in the keyboard to be described below. On the left-hand of the circle the individual studs in the zones are labeled 5 through 9 and these also correspond to horizontal decade rows on the lower half of the keyboard.

The switch-arm is driven by a small synchronous motor 114 geared down to produce one revolution in 60⅗ seconds. This is required by the 102 switching studs at .588 each plus ⅗ second for the synchronizing pause.

*Two pulse keyboard and wiring*

Self contained sources of alternating current at three frequencies $f_a$, $f_b$ and $f_z$ are provided as indicated in FIG. 5.

For the starting pulse a lead 180 runs from lower terminal of $f_a$ to one stud of the starting stud pair 178. Similarly, a lead 180′ runs from the bottom terminal of $f_z$ to the twin starting stud in the pair 178. By having two separate studs here the lower terminals of $f_a$ and $f_z$ are connected only during a start time and frequency $f_z$ can never be impressed on signal studs during the time the switch-hand passes over them. This holds in the case of the other stud pairs throughout the switching circle 171.

The top terminals of all the frequency sources are connected to a bus 184 which connects to the top terminal of a resistance 97. The terminals of this resistance are connected across modulating terminal pair 96 of the radio transmitter 93. The lower terminal of the pair 96 goes through lead 186 to rotary contact arm 172. The voltage drop across resistance 97, of course, provides the modulating potential for the transmitter set.

The frequency current sources $f_a$ and $f_b$ are connected through leads 187 and 188, forming a pair which are connected to terminals on one side of all of the 100 keys in keyboard 28. A vertical row of figures 0 to 9 on the left-hand side of this keyboard numbers the horizontal rows or decade. The top five rows down to the marker 192 are served by the ten zones on the right-hand side of the switching circle 171. The lower five rows are served by the ten zones on the left-hand side of the switching circle 171.

In horizontal row 4 on the keyboard on spaces (or keys) 4 and 5 are represented two independent sets of contacts or switches. The lower poles of these switches connect to leads 187 and 188. The call number with these two keys pressed is 445. Accordingly, the top leads from key 4 go via lead pair 193 into zone 4 at (small number 4, the row number) in the zone. The top terminal from key 5 goes to zone 5 via lead pair 194 at the studs marked with the small number (row number) 4.

The segment 176 shown in zone 3 within the switching circle will light up small lamp 196 which will stay lighted all the time that studs in right-hand zone 3 are subject to switching. This will be the case for all other zones. Consequently, in the row of 10 lamps at the left of the top five rows of keys, such lights will glow progressively moving downward until right-hand zone 9 is passed at the marker 192. Then they will begin to indicate that the left half of the switching circle is being used and the lights in doing this will pass downward until they reach the bottom one 196'.

Call numbers can be punched into either the upper or the lower half of the keyboard whenever all its lights are out. The progress toward becoming lit or darkened can also be observed. There is about 30 seconds of punching time on either half of the keyboard while the other half is switching so that it is possible to make calls almost continuously or at least, with a maximum delay of one minute. FIG. 3 shows a simplified version. There lamp 197 is connected to segment 197' and lamp 198 to segment 198', each segment being semi-circular or nearly so. If used in FIG. 5, it would show which half of the keyboard can be punched. In FIG. 3, it may merely reassure the operator that the rotary switch is operating, since keys can be pressed at any time.

THE 3150 CALL KEYBOARD

If more frequency sources are added, for seven times as many users, it is not necessary to add entire additional keyboards. Six added frequencies are practical. The addition of only seventy additional keys provides for the transmission of the entire 7×450 or 3150 calls. The same single vertical row of lights ending with 196' provides the progressive indication of the signaling just as well for all calls as for the single keyboard system of FIG. 5.

FIG. 5A shows the first horizontal row and the last horizontal row of such a system keyboard with connections. If we assume that at the locations where switches are shown in the right-hand half of FIG. 5A, the corresponding keys are punched and hence the switches closed, then in the top row the code call 019 has been punched (considering only the right-hand side of FIG. 5A) and in the bottom row the call 939 will be transmitted. Not all of the wiring has been drawn in but only a sufficient amount for illustration.

On the left-hand side of the figure the sets of seven keys, *b, c, d, e, f, g* and *h* are each capable of cutting in their respective frequencies on a bus 199 which serves all the keys in the same horizontal row on the right-hand side of the keyboard. The bus 199' serves all these 100 keys with $f_a$ current.

If heavy traffic is expected, two or three keyboards as shown in FIG. 5A will permit making the corresponding number of calls in one row, provided only that they are made on different frequencies. Interlocking of the frequency keys or signal lights can be used to avoid making two calls in the same row with one frequency.

In a keyboard such as that partially shown in FIG. 5A, numbers can be ascribed to the frequencies impressed so that *ab, ac, ad, ae, af, ag*, and *ah* can be, respectively, 1, 2, 3, 4, 5, 6 and 7. The code call would therefore have four digits. In the first or top row assume that the current of frequency *b* is impressed by pressing down the extreme left-hand key in the top row then the code call (assuming the right half to be pressed as above) would be 0119. The numeral for choosing the row is given the first position so that the operator will know the row in which to begin punching keys. At the same time if the frequency *h* is impressed by pressing the last or right-hand key in the bottom row of the left bank of keys, the code call is 9739. Of course, both these and other calls (one to each row) can be made within the same switching cycle.

It must be constantly remembered that for a given call number the actual connection to desired frequencies is not made until the sending switch arm 172 (in FIG. 5) reaches the dual studs sending out a particular call. Thus, unwanted or spurious calls are avoided although a maximum of four frequencies may at times be impressed as a result of the currents flowing through the resistor 97 of FIG. 5. Each frequency current should have a maximum or peak value of ¼ of the permisible maximum value of the allowable peak current in resistor 97 when a system is designed to take care of a maximum of four simultaneous frequencies during any switching cycle. This does not have a too severe practical disadvantage.

Each receiver would still have only 3 reeds, the reed *b* being replaced by another in all instances except those to be paged with *ab* frequencies.

ADAPTATION TO TELEPHONE DIALING

For a great many, if not the largest number of paging sets, there will always be an operator for punching the keys and also to receive the call-backs from those paged. This is especially so in factories, buildings, and other businesses. Where desired, as in case of regional operation, this invention can be adapted to telephone operation. The degree of difficulty is much less than with existing systems.

If this is done with a two paging-pulse system covering a region having 7 keyboards of 100 keys with a total of 3150 calls and with each call being of four digits, this is possible because there is no complicated encoding to do—all that is needed being at most the closing of a few double pole switches for any call. This is indeed an advantage in cost, development time and reliability for the sending set of a large city-wide installation.

In the case of such a dialed paging operation, the person calling (after dialing paging center) would first hear a distinctive tone indicating that he was connected with the paging center and should dial. He would then start to dial his numerical paging call. If one of the digit rows including the call that he wanted was busy, he would hear a busy signal. Depending on the circuitry, he could keep trying or could hang up and try again. Within one or two minutes, he would normally not hear the busy signal and would be able to get through.

It might be desirable, however, to store the calls by telephone equipment already available so that at the earliest time that the necessary digit row was open the call would go out automatically without further attention from the caller. It would not be too difficult a job to devise the sending station so that normally a paging call would go out routinely at one-minute intervals for two or three times but that in the case of another call received for this digit row, this routine would be broken into and the two calls be sent out at one-minute intervals but in alternating sequence. More detail on this is inappropriate here as it is a problem in telephone plant design and outside the scope of the present application except to point out the possibilities.

THE BATTERY IN THE RECEIVER

It may be convenient to use the same battery for operating the paging function that is used for the radio receiver. A mercury battery of any suitable voltage is recommended. It should be noted that during the period when no call is arriving, there can be a total of only about one second per minute drain on the battery by the paging function. This applies to all of the forms discussed above, and makes for long battery life.

THE SELF-STOPPING WATCH MECHANISM

Instead of using the clutch-brake described above, a self-stopping watch or clockwork mechanism can be used, and one form of such mechanism is illustrated in FIGS. 12 and 13. Either form of stopping and starting on signal may be used with any of the other features described. A clockwork stopped by an electromagnet may also be used, as disclosed in Ser. No. 125,470 but the self-stopping watchworks of the present invention is at present preferred for simplicity and because of greater certainty that it successfully solves the problem of having the watch invariably start again and always in exactly the same starting speed. Even slight variations in starting can be cumulative with any other inaccuracy and reduce the number of contact positions that would be safely used in a one-minute cycle. A clutch-brake has the advantage of using a standard watch movement with little if any change. A self-stopping watch movement has the advantages of eliminating the clutch if the watch movement, itself, is modified, and of using only about half of the current, thus prolonging the life of the battery. A choice between the two methods may be made upon the basis of manufacturing expediency.

Before describing the solution to the problem of reliable and uniform stopping, it is desiralbe to refer to FIG. 10 which shows the escapement mechanism which is the heart of the timing mechanism of a typical watch movement. This drawing was adapted from a Waltham Watch Company handbook.

The mainspring (not shown) through a gear train (not shown) tries to drive the escape wheel 201 in a clockwise direction. It is prevented from doing this continually by the forked pallet 202 which allows the escape wheel to travel clockwise in quick jerks. The pallet with its two jewels 203 and 204, where it contacts the teeth 206 of the escape wheel, is limited in its oscillation by two banking pins 207 and controlled in its timing by the pin 208 on the balance wheel assembly, 211 in FIG. 11, which is oscillated by a hair spring, not shown. The balance wheel, which is about the same diameter as the escape wheel but which is not shown, is on the same staff as a roller 209. The roller and its attendant balance wheel oscillate and govern the movement of the fork from one banking pin to another. Each time that the fork makes the trip from one banking pin to the other there is a tick of the watch and the escape wheel moves forward suddenly and by a slight amount. Five ticks to the second has become a customary standard in the watch industry so that the second hand on a watch, although it appears to be moving forward continuously, is actually progressing in small quick jerks and is standing still most of the time. Since there are 15 teeth on the escape wheel 201 shown in FIG. 10, it makes a full revolution in three seconds and has to be geared to the second hand with a ratio of 20 to 1 in order for the second hand to rotate one revolution per minute.

The semicircular jewel pin 208 on roller 209 actuates the forked pallet at the mid-point of each full oscillation of the balance wheel. One of the fortunate and ingenious things about the arrangement shown in FIG. 10 is that the escape wheel imparts a small push to the jewel pin 208 on the roller each time it passes the fork, always in the direction pin 208 is already moving, thus boosting its movement and ensuring continuous operation of the timepieces.

In order to stop a watch and be positive that it will start again by itself, the balance wheel must be arrested at near the end of one of its swings. It is desirable to study the action of the balance wheel in order to do this.

FIG. 11 indicates the balance wheel cycle diagrammatically. Let the point *a* represent the angular position of the starting point of the jewel pin 208. Point *a* thus is in a radial plane which is the extreme position of the clockwise direction of movement in a circular travel path of the jewel 208. Since this is at the end of a swing, with all energy storage now in the hairspring, the jewel 208 now moves in the direction of the arrows throughout its cycle of operation, the jogs in the illustration being necessary for clarity. When jewel 208 has traveled a distance of approximately 300 angular degrees, at the first jog *b* the jewel pin shifts the forked pallet 202 and causes the escape wheel to move clockwise one tooth, in the course of which it causes the pallet 202 to give the balance wheel a slight push. The balance wheel now has momentum enough to swing from point *b* in the direction of the arrows for another 300 degrees to the point *c* which is the end of the counter clockwise swing and where it reverses direction. It moves from point *c* in the direction of the arrows, and at point *d* it again actuates the pallet 202 and gets a push. From point *d* it moves in the direction of the arrows for another 300 degrees to point *e* where another reversal occurs and the cycle is started all over again as shown by the cross-over line in the diagram which leads back to point *a*.

According to the present invention, a small pin 216 on the rim of the balance wheel is intercepted, in order to effect the stop, about 90 degrees after a reversal. When released, it still has 210 degrees to swing before it actuates the pallet 202, which is the neutral point for the hair spring. In other words, the hair spring is still wound up an amount equal to 210 degrees. Far less wind up than this would be enough for a start.

STRUCTURAL DETAILS OF THE SELF-STOPPING WATCH

FIG. 12 shows in plan and FIG. 13 in the edge view, the simplified essential details of a self-stopping movement.

The stop pin 216 is of stainless steel about .005" in diameter. It is forced into a drilled hole in the rim and extends up from the surface of the rim by a convenient distance, say .032". The balance wheel 211 has a small amount of metal (as by drilling) taken off it underside near this pin so that its "poise" (as the watch people call it) will not be changed. The circle 201 represents the position and approximate outside diameter of the escape wheel. Some other essential gears are also represented by circles of their approximate pitch diameter. Between balance wheel 211 and escape wheel 201 lies the forked pallet 202 shown in FIG. 10 but not shown here.

*The stopping vane*

Driving pinion 217, driven gear 218, driving pinion 219 and driven gear 221 form part of the reduction train in FIG. 12. Only the pitch circles are shown. The staff 222 of the last driven gear 221 carries an arm 223 revolving with it at the same speed as the switch-arm 17 since it is this staff which carries the switch-arm. On arm 223 is mounted a block 224 which carries a stopping vane 226, which vane also revolves at the same speed and around the same axis as the switch-arm. Stopping vane 226 is made of Phosphor bronze about .003" thick. It has a narrow arcuate tip 227 of the same curvature as seen in plan view as the circle of movement of stop pin 216. It is formed to slope downward slightly as can be seen in the edgewise view of FIG. 13.

The normal position of this stopping vane 226, if unrestrained, would be slanting slightly upward from the horizontal (sufficiently for the tip 227 to clear the stop pin 216). Actually, however, in FIG. 13, the stopping vane 226 has been depressed until it is in the horizontal position. This has been done by stationary leaf spring 228 which has a gently sloping surface on its underside. The depressing spring 228 can be made of Phosphor bronze .008" thick.

With the depressing spring 228 in the position shown and with the balance wheel (and stop pin 216) coming around in a counterclockwise direction as viewed in FIG. 12, the stop pin will slide under the tip 227 raising it slightly. It can do this because the entire vane 226 is flexible all the way back to block 224 where it is fastened. There is a circular hole in this vane to avoid friction on staff 222. The balance wheel will therefore (after sliding under tip 227) complete its swing and start to return. In returning, following this time a clockwise rotation, it is hung up on tip 227 as shown in the drawings. As tip 227 is short, stoppage of pin 216 under it would also work. As explained in connection with FIG. 11, when released it still has 210° to go before striking the pallet and fork with the jewel pin.

*Starting the watch*

The way in which the watch is started is to push upward on the flexible depressing spring 228. This lets tip 227 rise and clear stop pin 216. This is done by exciting electromagnet 231 (shown in FIGS. 12 and 13) which attracts one end of lever 232, pivoted at 233 and holding at its other end a release pin 234.

As soon as the balance wheel is released, it travels its required 210° to the forked pallet 202 (which takes it one tenth of a second) and causes the escape wheel 201 and the entire reduction train, the contact arm 17 and the stopping vane 226, to jump forward by the space of one tick of the watch. Since staff 222 and all that it carries including the stopping vane 226, is moving forward in a clockwise direction, tip 227 swings out of the path of the stop pin 216 before the stop pin can get back to the place where it was stopped. In fact before the stop pin returns to the stop position the tip 227 swings away by the space of two ticks. For an entire revolution of staff 222 the balance wheel 201 will now be free. After the stopping vane 226 has turned through a small angle it moves out from under the depressing spring 228 and springs upward slightly so that when it has to cross the path of the stop pin 216 again (when stopping vane 226 has revolved about 60°) it clears this pin easily.

*Calibrating the watch*

Standard means of fast and slow adjustment (not shown) should be retained on the watch. Although great inaccuracies can be tolerated, it may be desired to check the accuracy of the timepiece every year. Testing can be done easier than for an ordinary watch and in shorter intervals by exciting release electromagnet 231 and keeping it excited while the switch-arm is allowed to make any desired number of revolutions. When the excitation is removed the switch-arm will always stop at the same place and at an integral number of revolutions. This can be compared with a stop watch that is started when the switch-arm is started and stopped when the switch-arm stops.

*Vibrating reed relays*

The benefits of some aspects of this invention could be achieved by frequency discriminators in the form of electrical filters. For compactness and reliability reed relays are greatly preferred, however.

Figure 8:
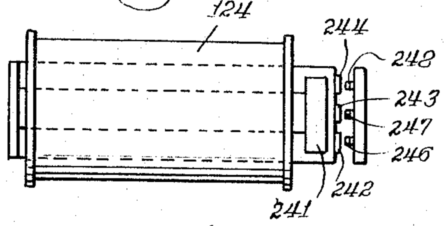
FIGURES 8 and 9 are views from side angles separated by 90° of a reed relay which may be used according to the present invention.
Figure 9:
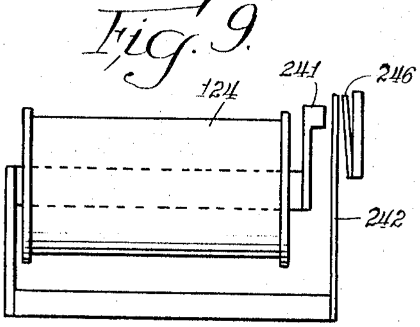

Although vibrating reed relays are already known, FIGURES 8 and 9 illustrate one such relay for the purpose of explaining some considerations with respect to them. Coils 124 energize the magnetic circuit which terminates with pole piece 241 at one end and with magnetic reeds 242, 243 and 244 at the other end. If current energizing the coil 124 has the characteristics of the proper frequency or frequencies, it will cause or set up vibration of one or more of the reeds 242, 243 and 244, causing corresponding repeated contact with one or more of the spring contact 246, 247 or 248.

Such relays are not of the instantaneous action of more common relays, but require a fraction of a second to increase their vibrations to the point of making contact and after deenergization of the coil 124 may continue to make contact for a further fraction of a second during the decay of the vibrations.

It is the decay time which necessitates the intermingling of groups already described in connection with FIGURES 4 and 5. This decay time also necessitates, even with the one paging pulse system of FIGURE 1, having the vibrating relays energized under the control of the rotary contact device, so that they will receive no paging pulse except while the contact 13 is closed. If coil 124 were connected directly to the output of radio receiver 35, so as to be energized by all pulses transmitted, and if its controlled circuit were extended through contact 13, a pulse of the right frequency immediately before contact 13 is closed could cause a false signal through contact 13 because the decay time would maintain the circuit through the contact 13.

The slowness of reed relays to close their contacts must also be taken into consideration. The pulses reaching reed relay 124 must be long enough to ensure effective actuation of the reed relay. A pulse of .2 second is enough, and so the .58 second which is contemplated to be provided by the rotary sending switches of FIGURES 3 and 5 allows for much error.

It is essential not to let the rotary switch cut the pulse time off in the receiver so as to be less than .2 second or too short to safely actuate relay 124. With perfect unvarying synchronization there would be no problem. There is a problem of accommodating the small errors which must be expected.

The stopping contact 16 is designed to stop the sweep-hand 17 of all paging receivers at a point experience determines to be ideal. This may be such a point that as sweep-hand 17 starts it will be in phase with the pulses. This means that the time-center of the contact of brush 17A with contact stud 13, coincides with the time-center of the corresponding paging pulse. It is hoped that flat-sided contacts 16 will give the required uniformity. If not, the contact may be eccentric on its stud, adjusted and tightened.

The expected inaccuracy of drive which necessitates synchronization of the rotary switch each revolution may cause a slight departure from this "in phase" relationship, especially as the later contact positions are reached. Such phase discrepancies are accommodated by making contact 13 (and contacts 13 and 13A in FIG. 4) of such dimension in the circular direction about the switch axis that the contact with brush 17A is maintained long enough so that with the maximum phasing discrepancy to be allowed for, the pulse will be transmitted to the coil 124 for at least the chosen minimum time. To allow for exceptionally weak signals, this may be .3 or .4 second instead of .2 second. However, the dimensions should not be so long that with this same phase displacement enough of an adjacent pulse will be impressed on the reed relay to actuate it. These critical times depend somewhat on the characteristics of the particular reed relays and the contact dimensions may be designed accordingly. The nominal .6 second spacing of impulse centers may prove to have been conservative. If .4 is enough, this would permit 150 impulses per one-minute cycle. Less than 30, perhaps even less than 60 would be wasting the facilities made possible by this invention.

To aid in avoiding false signals with large numbers of contacts, it is noted that the contact size which will permit the greatest phase discrepancy is that which when added to the pulse duration in the radio receiver output gives a sum equal to the sum of three figures: (1) the time-spacing of pulse centers, (2) the minimum time chosen for dependable relay actuation, and (3) the maximum time the relay can safely be subjected to a pulse of proper frequency without contact closure. Assuming here that these times are .6, .3 and .1 this total is 1.0, and if pulse duration is .6 second, contact closing duration should be .4 second. If pulse durations are reduced to .5 second, with .1 second between them, the contact duration should be .5 second. Either way, a phase discrepancy of .2 second, fast or slow, is tolerated. This is more than is at present believed necessary.

A possible source of major phase discrepancy would be in the case of fringe area reception if the received output pulse was almost too weak, in spite of automatic gain control, to energize reed relay 39 in FIG. 1 or 124 in FIG. 4. This might cause slow starting of sweep-hand 17 of the signal-synchronized rotary switch 11. This can be guarded against by terminating the synchronizing pulse in sending before false signals would result if actuation of relay 124 occurred only at the very end of the impulse. Termination even a trifle earlier will avoid using up all of the tolerable phase discrepancy. Synchronizing contacts 86 in FIG. 3 and 178 in FIG. 5 may be adjustable to give optimum phasing for all of the identical receivers. If front and rear edges are separately adjustable, optimum normal phasing and optimum duration can both be given.

According to a conception not yet worked out in detail, starting with extremely precise timing can be achieved by starting at the end of the pulse. One way of doing so is to add a conventional quick acting relay having its coil energized when reed relay coil 39 is energized, and having a "back" (normally closed) contact in series with the reed or reeds in the starting circuit. The back contact will open first and will close to complete the starting circuit immediately at the end of the pulse, closing before the reed vibration decays enough to cease closing its contacts. The quick acting relay might advantageously have an electrical filter in its energizing circuit confining its energization to its intended modulation frequency, in which case a higher modulation frequency than those at which reeds work best would probably be used for it.

Proper design of the paging contacts will permit the paging impulses to follow one another at a minimum frequency for reliable operation of the reed relay used, with the degree of precision achieved in starting. This in turn justifies a design using the high number of contact positions per cycle here illustrated, with every expectation that even higher numbers and hence greater capacity will prove possible.

*Simplifications and flexibility*

No doubt, experience will show that considerable simplification of the systems disclosed is possible. For example, it already seems apparent that the use of pairs of contacts in the system of FIGS. 4 and 5 can be avoided by providing a two-contact relay for each of the pairs of frequency desired, each relay connecting the sources of its two frequencies to the circuit that includes sending modulation resistance 97. A single synchronizing contact 178 can then be connected to one of these relays. The first paging contact 179 can be connected to a key on each of the keyboards provided, which in turn will connect that contact to one of the other frequency combination relays (each keyboard to a different one) so that that relay will be energized when brush 173 engages that contact 179.

If there are two or more keyboards, they need not all be wired for the same system, specifically as are all of FIGURE 5 or all of FIGURE 3. One can be wired for one system and one for the other. Indeed, a third could be wired for some other system. For example, a keyboard using two pulses but without grouping could page selectively between over 8,000 receivers. Only one call could be made per cycle, but such a system might be appropriate for users who rarely receive page calls.

For such multi-system flexibility, only one rotary sending switch and two types of receivers would be needed. The difference in paging signals would be a matter of the wiring of the keyboards and their prescribed use. All of the receivers responsive to the modulation frequency of the keyboard designed according to FIGURE 3 would be of the one pulse receiver type shown in FIGURE 1. All of the other receivers could be of the two paging pulse type, since with appropriate contact settings they would serve equally well with either of the other systems described, or with other two-pulse groupings. Each would have a frequency responsiveness only to the frequency of the keyboard for which its contacts had been positioned.

As to any points not specifically covered herein, the disclosures of the applications mentioned in the opening paragraph are incorporated herein by reference. However, the present application corrects some errors therein and represents present thinking where there is discrepancy.

*Definitions*

It may be helpful to define some language used in the claims, especially if the meaning is neither completely self-evident nor clear from the foregoing descriptions.

In the sending station, a "signal cycling switch" may be a rotary switch such as 85 of FIGURE 3, or 171 of FIGURE 5, or other switch of like effect.

In the receiver a "connection timing means" may be a rotary switch such as switches 11 or 11' or other timing means performing a like function. "Signal-synchronized" means a timing means (or rotary switch, if so specified) which is caused (as by a start from a predetermined position) to start timing from the "synchronizing" or "starting" impulse, such as that derived from contacts 178 in FIG. 5 and 86 in FIG. 3.

"Clock-accurate" means accuracy such as may be expected of clockworks. The synchronous motor driving the sending stations is the ultimate, but in the portable receiver that accuracy expectable from a watch movement is especially contemplated. "Clockwork" is especially intended to distinguish from a synchronous motor driven from a utility power supply, and may not be intended to require that its clock-accuracy be derived from an escapement device unless specified.

"Constantly and firmly coupled" distinguishes from the use of a clutch which is released or expected to slip during the normal cycle.

"Bi-stable" means self-holding in two different positions without power consumption.

"Audio-class" frequency is intended to distinguish from radio and intermediate frequencies, and connotes a frequency suitable for reed relays.

An "alert device" is any device that informs the user he has been paged.

A "relay" may be a solid state relay instead of those shown, unless more is specified.

The reference to a "multitude" of paging receivers is to emphasize the capacity of which this invention is capable in making use of the precision timing contemplated. Even such small multitudes as 60, or perhaps 30, would represent some need for precision in a single paging pulse system.

The terms "pulse" and "impulse" are used interchangeably, at least usually.

The term "switching cycle," or "cycle" is used with reference to the period during which all of the contact positions are traversed once.

*Achievements*

The inventions of the present application open the door to a type of radio paging which has not previously been available on the market. It has great flexibility, and great potential from the standpoint of handling moderate or large numbers of separate paging receivers with a traffic capacity amazingly high for the number of paging receivers available.

If the single paging pulse system of FIGS. 1 to 3 is used, whether or not it is the only system used, it has unlimited traffic capacity in that within one minute all of the paging receivers could be paged. Furthermore, if desired, a subscriber's key can be left pressed all day or until he responds, without interfering with other calls.

With a two-paging pulse system such as that of FIGS. 4 and 5, there may be a great many more paging receivers, and although only 10 calls from one keyboard can be placed per minute, this will still, in most instances, be a very satisfactory traffic capacity. As in the other version, a call can still be automatically repeated over and over in case a given paging receiver was temporarily shielded or otherwise deactivated. In this instance, the call will thus be continued only until the same row of the keyboard is needed for another call.

With both types of system, or others, the number of available paging receivers can be multiplied without interference by one another by adding another modulation frequency for each additional multitude of receivers. The preferred forms, in which two coinciding frequencies are required in every impulse (and to a less extent with only one modulation frequency) substantially eliminates false paging calls.

When various combinations of two frequencies are used, the fact that one frequency is common to all combinations excludes false calls by coincidence, and permits simultaneous, nonconflicting, voice transmission with only that one frequency filtered out.

In spite of all of these advantages, the systems are especially suitable for personally portable paging receivers, carried in the user's pocket.

Although it is perhaps redundant to stress the point, the structure of the senders of the system, whether of the type in FIG. 3 or that of FIG. 5 are adapted for substantially continuous and uniform operation throughout the entire operating day or even, if desired, on a 24-hour basis, without a special manual restarting operation. This contributes to capacity and facilitates repeating paging calls.

What I claim is:

1. A radio paging system including a multitude of selective radio paging receivers and a radio sending station for selectively paging any one thereof:

the sending station including radio sending means, synchronizing means for causing the sending means to send a synchronizing impulse modulated by a combination of two frequencies, and including paging signal means for causing the sending means to send paging signals each modulated with another combination of two frequencies, with clock-accurate timing from the synchronizing impulse;

said paging receivers each including a radio receiver having an audio-class output reflecting said frequencies, clock-accurate connection timing means, and alert means, and vibrating armature relay means for controlling the alert means, connected under control of the connection timing means to be energized by the output of the radio receiver when a pulse is received of correct modulation frequency and with correct timing after the synchronizing pulse for paging the particular receiver, the connection timing means otherwise maintaining the relay means de-energized during the reception of paging signals, so that no false paging will result from the decay time of the relay means even if a paging impulse intended for another paging receiver is received immediately preceding said correct timing;

and said sender including means for sending paging impulses, for various receivers of the multitude, in close succession; whereby false paging could result if such relays were subjected indiscriminately to all of the impulses received.

2. A radio paging system including multitudes of selective radio paging receivers and a radio sending station for selectively paging any one thereof:

the sending station including radio sending means, synchronizing means for causing the sending means to send a synchronizing impulse modulated by a combination of two frequencies, and including paging signal means for causing the sending means to send paging signals each modulated with another combination of two frequencies, with clock-accurate timing from the synchronizing impulse;

said paging receivers each including a radio receiver having an audio-class output reflecting said frequencies, clock-accurate connection timing means, and alert means, and vibrating armature relay means for controlling the alert means, connected under control of the connection timing means to be energized by the output of the radio receiver when a pulse is received of correct modulation frequency and with correct timing after the synchronizing pulse for paging the particular receiver, the connection timing means otherwise maintaining the relay means de-energized during the reception of paging signals, so that no false paging will result from the decay time of the relay means even if a paging impulse intended for another paging receiver is received immediately preceding said correct timing;

and said sender including means for sending paging impulses, for various receivers of the multitude, in close succession; whereby false paging could result if such relays were subjected indiscriminately to all of the impulses received;

said sending station also including means for sending simultaneously with the foregoing paging impulses separately chosen paging impulses modulated with still another combination of frequencies for selectively paging one from another multitude of radio paging receivers responsive in the same manner, on a timed basis, to the paging impulses modulated by said last-named combination of frequencies.

3. A radio paging system including multitudes of selective radio paging receivers and a radio sending station for selectively paging any one thereof;

the sending station including radio sending means, synchronizing means for causing the sending means to send a synchronizing impulse modulated by a combination of two frequencies, and including paging signal means for causing the sending means to send paging signals each modulated with another combination of two frequencies, with clock-accurate timing from the synchronizing impulse;

said paging receivers each including a radio receiver having an audio-class output reflecting said frequencies, clock-accurate connection timing means, and alert means, and vibrating armature relay means for controlling the alert means, connected under control of the connection timing means to be energized by the output of the radio receiver when a pulse is received of correct modulation frequency and with correct timing after the synchronizing pulse for paging the particular receiver, the connection timing means otherwise maintaining the relay means de-energized during the reception of paging signals, so that no false paging will result from the decay time of the relay means even if a paging impulse intended for another paging receiver is received immediately preceding said correct timing;

and said sender including means for sending paging impulses, for various receivers of the multitude, in close succession; whereby false paging could result if such relays were subjected indiscriminately to all of the impulses received;

said sending station having modulation source means for at least four frequencies and having rotary switching means driven with clock accuracy and including successive contacts for controlling the sending of paging impulses, and keyboard means with keys for selectively connecting said successive contacts and controlling pairs of contacts for selectively connecting either one or both of two different pairs of three of said modulation frequencies under control of said successive contacts, each key causing connection of two modulation frequencies separately, and said sending station including means connecting one of said three frequencies and the fourth frequency to the sending means for modulating the synchronizing impulse.

4. A radio paging system including multitudes of selective radio paging receivers and a radio sending station for selectively paging any one thereof;

the sending station including radio sending means, synchronizing means for causing the sending means to send a synchronizing impulse modulated by a combination of two frequencies, and including paging signal means for causing the sending means to send paging signals each modulated with another combination of two frequencies, with clock-accurate timing from the synchronizing impulse;

said paging receivers each including a radio receiver having an audio-class output reflecting said frequencies, clock-accurate connection timing means, and alert means, and vibrating armature relay means for controlling the alert means, connected under control of the connection timing means to be energized by the output of the radio receiver when a pulse is received of correct modulation frequency and with correct timing after the synchronizing pulse for paging the particular receiver, the connection timing means otherwise maintaining the relay means de-energized during the reception of paging signals, so that no false paging will result from the decay time of the relay means even if a paging impulse intended for another paging receiver is received immediately preceding said correct timing;

and said sender including means for sending paging impulses, for various receivers of the multitude, in close succession; whereby false paging could result if such relays were subjected indiscriminately to all of the impulses received;

said sending station having modulation source means for at least four frequencies and having rotary switching means driven with clock accuracy and including successive contacts for controlling the sending of paging impulses, and keyboard means with keys for selectively connecting said successive contacts and controlling pairs of contacts for selectively connecting either one or both of two different pairs of three of said modulation frequencies under control of said successive contacts, each key causing connection of two modulation frequencies separately, and said sending station including means connecting one of said three frequencies and the fourth frequency to the sending means for modulating the synchronizing impulse, and a second set of keys for choosing the frequency combination which a group of keys of said keyboard will connect to said pairs of contacts.

5. A radio paging system including a multitude of selective radio paging receivers and a radio sending station for selectively paging any one thereof;

the sending station including radio sending means, synchronizing means for causing the sending means to send a synchronizing impulse modulated by a frequency, and including paging signals means for causing the sending means to send paging signals each modulated with another frequency, with clock-accurate timing from the synchronizing impulse;

said paging receivers each including a radio receiver having an audio-class output reflecting said frequencies, clock-accurate connection timing means, and alert means, and vibrating armature relay means for controlling the alert means, connected under control of the connection timing means to be energized by the output of the radio receiver when a pulse is received of correct modulation frequency and with correct timing after the synchronizing pulse for paging the particular receiver, the connection timing means otherwise maintaining the relay means de-energized during the reception of paging signals, so that no false paging will result from the decay time of the relay means even if a paging impulse intended for another paging receiver is received immediately preceding said correct timing;

and said sender including means for sending paging impulses, for various receivers of the multitude, in close succession; whereby false paging could result if such relays were subjected indiscriminately to all of the impulses received.

6. A radio paging system including multitudes of selective radio paging receivers and a radio sending station for selectively paging any one thereof;

the sending station including radio sending means, synchronizing means for causing the sending means to send a synchronizing impulse modulated by a frequency, and including paging signal means for causing the sending means to send paging signals each modulated with another frequency, with clock-accurate timing from the synchronizing impulse;

said paging receivers each including a radio receiver having an audio-class output reflecting said frequencies, clock-accurate connection timing means, and alert means, and vibrating armature relay means for controlling the alert means, connected under control of the connection timing means to be energized by the output of the radio receiver when a pulse is received of correct modulation frequencies and with correct timing after the synchronizing pulse for paging the particular receiver, the connection timing means otherwise maintaining the relay means deenergized during the reception of paging signals, so that no false paging will result from the decay time of the relay means even if a paging impulse intended for another paging receiver is received immediately preceding said correct timing;

and said sender including means for sending paging impulses, for various receivers of the multitude, in close succession; whereby false paging could result if such relays were subjected indiscriminately to all of the impulses received;

said sending station also including means for sending simultaneously with the foregoing paging impulses, separately chosen paging impulses modulated with another frequency for selectively paging one from another multitude of radio paging receivers responsive in the same manner, on a timed basis, to the paging impulses modulated by said last-named frequency.

7. A radio paging system including multitudes of selective radio paging receivers and a radio sending station for selectively paging any one thereof;

the sending station including radio sending means, synchronizing means for causing the sending means to send a synchronizing impulse modulated by a frequency, and including paging signal means for causing the sending means to send paging signals each modulated with another frequency, with clock-accurate timing from the synchronizing impulse;

said paging receivers each including a radio receiver having an audio-class output reflecting said frequencies, clock-accurate connection timing means. and alert means, and vibrating armature relay means for controlling the alert means, connected under control of the connection timing means to be energized by the output of the radio receiver when a pulse is received of correct modulation frequency and with correct timing after the synchronizing pulse for paging the particular receiver, the connection timing means otherwise maintaining the relay means de-energized during the reception of paging signals, so that no false paging will result from the decay time of the relay means even if a paging impulse intended for another paging receiver is received immediately preceding said correct timing;

and said sender including means for sending paging impulses, for various receivers of the multitude, in close succession; whereby false paging could result if such relays were subjected indiscriminately to all of the impulses received;

said sending station having modulation source means for at least said frequencies and having rotary switching means driven with clock accuracy and including successive contacts for controlling the sending of paging impulses, and keyboard means for selectively connecting one of said modulation frequencies to be controlled by said contacts, and said sending station including means connecting another frequency to the sending means for modulating the synchronizing impulse, and a second set of keys for choosing the frequency which a group of keys of said keyboard will connect to said contacts.

8. A radio paging system including a multitude of selective radio paging receivers, and a radio sending station for selectively paging any one thereof, each paging receiver including a radio receiver having an audio-class output, a vibrating reed relay characterized by appreciable decay time after energization ceases, a signal-synchronized rotary switch having a rotary brush and a multitude of contact positions wiped by the brush with clock-accurate timing during one synchronized revolution for connecting said relay to the output of the radio receiver, an alert device, means for activating the alert device in response to separate relay actuations during said revolution for each of said paging contacts with a time interval between actuations, the sending station including radio sending means, a modulation source, a signal cycling switch and means associated therewith for causing the radio sending means to transmit a synchronizing pulse, and a keyboard associated with the signal cycling switch and cooperating with it to cause the radio sending means to transmit a plurality of paging pulses, said cycling switch including a series of paging contacts closed in succession by the cycling switch with substantially no intervening time gap in the series, said keyboard having switches connected to the contacts in such an arrangement that the contacts connected by the keys for paging any one paging receiver will be spaced apart in the cycle by other contacts to allow the needed decay time for that receiver to distinguish two pulses, the paging contacts of all paging receivers being spaced to provide decay time for the relay.

9. A radio paging system including a multitude of selective radio paging receivers, and a radio sending station for selectively paging any one thereof, each paging receiver including, a vibrating reed relay characterized by appreciable decay time after energization ceases, a signal synchronized rotary switch having a rotary brush and a multitude of contact positions successively wiped by the brush with clock-accurate timing during one synchronized revolution, a plurality of paging contacts located in some of said positions for connecting said relay to the output of the radio receiver, an alert device, means for activating the alert device in response to separate relay actuations during said revolution for each of said paging contacts with a time interval between actuations, the sending station including radio sending means, a modulation source, a signal cycling switch and means associated therewith for causing the radio sending means to transmit a synchronizing pulse, and a keyboard associated with the signal cycling switch and cooperating with it to cause the radio sending means to transmit a plurality of paging pulses, said cycling switch including a series of paging contacts closed momentarily in rapid succession by the cycling switch, said keyboard having keys arranged in a plurality of identified rows, the row identifications corresponding to one digit of the numbers by which the paging receivers are identified and called, and the keys within each row corresponding to other digits of said numbers, and switches operated by the keys, with the switches of one row, comprising the switches needed for selective page calls for a group of receivers, connected to contacts in the signal cycling switch which are separated from one another by contacts connected to the switches actuated by the keys of other rows, whereby the pulses corresponding to any one call will be time-separated from one another to provide a decay time between pulses for the paging receiver being paged.

10. A radio paging system including a multitude of selective radio paging receivers, and a radio sending station for selectively paging any one thereof, each paging receiver including, a vibrating reed relay characterized by appreciable decay time after energization ceases, a signal synchronized rotary switch having a rotary brush and a multitude of contact positions successively wiped by the brush with clock-accurate timing during one synchronized revolution, exactly two paging contacts located in two of said positions, both within one of several sets of said contact positions for connecting said relay to the output of said radio receiver, each set having the same location in all of said paging receivers and having the various positions comprising the set interspersed individually with the positions comprising members of other sets, an alert device, means for activating the alert device in response to separate relay actuations during said revolution for each of said paging contacts, with a time interval between actuations, the sending station including radio sending means, a modulation source, a signal cycling switch and means associated therewith for causing the radio sending means to transmit a synchronizing pulse, and a keyboard associated with the signal cycling switch and cooperating with it to cause the radio sending means to transmit two paging pulses for each station to be paged, said cycling switch including a series of paging contacts closed momentarily in rapid succession by the cycling switch, said keyboard having the keys arranged in several numbered groups, the group numbers corresponding to one digit of the numbers by which the paging receivers are identified and called, and there being one group for each of said several groups of said contact positions, and the keys within each row corresponding to other digits of said numbers, and switches operated by the keys, with the switches of one group, comprising the switches needed for selective page calls for all of the paging receivers having its paging contacts located in the corresponding group of paging contact positions, connected to contacts in the signal cycling switch which are separated from one another by contacts connected to the switches actuated by the keys of other groups whereby the pulses corresponding to any one call will be time-separated from one another to provide a decay time between pulses for the paging receiver being paged.

11. A radio paging system including a multitude of selective radio paging receivers and a radio sending station for selectively paging any one thereof;

the sending station including radio sending means, synchronizing means for causing the sending means to send a synchronizing impulse modulated by a frequency, and including paging signal means for causing the sending means to send paging signals of two paging pulses each modulated with another frequency, with clock-accurate timing from the synchronizing impulse;

said paging receivers each including a radio receiver having an audio-class output reflecting said frequencies, clock-accurate connection timing means, and alert means, and vibrating armature relay means connected under control of the connection timing means to be energized by the output of the radio receiver when a pulse is received with correct timing after the synchronizing pulse to be one of the paging pulses for the particular receiver, the connection timing means otherwise maintaining the relay means de-energized during the reception of paging signals, so that no false paging will result from the decay time of the relay means even if a paging impulse intended for another paging receiver is received immediately preceding said correct timing, the multitude of receivers comprising several groups, each having all of its various connection timing means effective for mutually exclusive parts of the time available between synchronizing impulses, whereby in each cycle several paging calls can be made, each selecting on a two-paging-pulse basis from a numerous group.

12. A radio paging system including a multitude of selective radio paging receivers and a radio sending station for selectively paging any one thereof;

the sending station including radio sending means, synchronizing means for causing the sending means to send a synchronizing impulse modulated by a frequency, and including paging signal means for causing the sending means to send concurrently plural paging signals of two paging pulses each modulated with a frequency, with clock-accurate timing from the synchronizing impulse;

said paging receivers each including a radio receiver having an output reflecting said frequencies, means rendering other distinguishing frequencies ineffective, clock-accurate connection timing means, and alert means, and relay means connected under control of the connection timing means to be energized when a pulse is received with correct frequency and correct timing after the synchronizing pulse to be one of the paging pulses for the particular receiver, the multitude of receivers comprising several groups, each having all of their various connection timing means effective for mutually exclusive parts of the time available between synchronizing impulses, whereby in each cycle several paging calls can be made, each selecting on a two-paging pulse basis from a numerous group.

13. A radio paging system including multitudes of selective radio paging receivers and a radio sending station for selectively paging any one thereof;

the sending station including radio sending means, synchronizing means for causing the sending means to send a synchronizing impulse modulated by a frequency, and including paging signal means for causing the sending means to send concurrently sets of plural paging signals of two paging pulses each modulated with a frequency, but with different frequencies distinguishing different sets, with clock-accurate timing from the synchronizing impulse;

said paging receivers each including a radio receiver having an output reflecting said frequencies, means rendering other distinguishing frequencies ineffective, clock-accurate connection timing means, and alert means, and relay means connected under control of the connection timing means to be energized when a pulse is received with correct frequency and correct timing after the synchronizing pulse to be one of the paging pulses for the particular receiver, the multitude of receivers responsive to each distinguishing frequency comprising several groups, each having all of their various connection timing means effective for mutually exclusive parts of the time available between synchronizing impulses, whereby in each cycle several paging calls can be made for each distinguishing frequency, each selecting on a two-paging pulse basis from a numerous group.

14. A radio paging system including multitudes of selective radio paging receivers tuned to a common carrier wave but with each multitude discriminative for a different distinguishing modulation frequency, and a radio sending station for selectively paging any one thereof;

the sending station including radio sending means, synchronizing means for causing the sending means to send a synchronizing impulse modulated by a combination of two frequencies to start a paging cycle, including paging signal means for causing the sending means to send, during each cycle and with clock-accurate timing from the synchronizing impulse, paging signals, as separately selected for each of the multitudes, each modulated with a distinguishing combination of two frequencies for each of the multitudes for which that signal has been chosen;

said paging receivers each including a radio receiver, clock-accurate connection timing means, modulation discrimination means, and alert means, and relay means for activating the alert means, connected under control of the connection timing means, and subject to the modulation discrimination means, to be activated in response to the output of the radio receiver when a pulse is received with the correct distinguishing frequency and the correct timing after the synchronizing pulse for paging the particular receiver.

15. A radio paging system including multitudes of selective radio paging receivers tuned to a common carrier wave but with each multitude discriminative for a different distinguishing modulation frequency, and a radio sending station for selectively paging any one thereof;

the sending station including radio sending means, synchronizing means for causing the sending means to send a synchronizing impulse modulated by a frequency to start a paging cycle, and including paging signal means for causing the sending means to send, during each cycle and with clock-accurate timing from the synchronizing impulse, paging signals, as separately selected for each of the multitudes, each modulated with a distinguishing frequency for each of the multitudes for which that signal has been chosen;

said paging receivers each including a radio receiver, clock-accurate connection timing means, modulation discrimination means, and alert means, and relay means for activating the alert means, connected under control of the connection timing means, and subject to the modulation discrimination means, to be activated in response to the output of the radio receiver when a pulse is received with the correct distinguishing frequency and the correct timing after the synchronizing pulse for paging the particular receiver.

16. A radio paging system including multitudes of selective radio paging receivers tuned to a common carrier wave but with each multitude discriminative for a different distinguishing modulation frequency, and a radio sending station for selectively paging any one thereof;

the sending station including radio sending means, synchronizing means for causing the sending means to send a synchronizing impulse modulated by a first frequency to start a paging cycle, and including paging signal means for causing the sending means to send, during each cycle and with clock-accurate timing from the synchronizing impulse, paging signals, as separately selected for each of the multitudes, each modulated with a distinguishing frequency for each of the multitudes for which that signal has been chosen;

said paging receivers each including a radio receiver, clock-accurate connection timing means, modulation discrimination means selectively discriminatory as to the first frequency and as to a distinctive frequency, and alert means.

means to start the timing of the connection timing means in response to the output of the radio receiver when an impulse of the first frequency is received, and relay means for activating the alert means, connected under control of the connection timing means, and subject to the modulation discrimination means, to be activated in response to the output of the radio receiver when a pulse is received with the correct distinguishing frequency and the correct timing after the synchronizing pulse for paging the particular receiver.

17. A radio paging system including multitudes of selective radio paging receivers tuned to a common carrier wave but with each multitude discriminative for a different distinguishing modulation frequency, and a radio sending station for selectively paging any one thereof;

the sending station including radio sending means, synchronizing means for causing the sending means to send a synchronizing impulse modulated by a frequency to start a paging cycle, and including paging signal means for causing the sending means to send, during each cycle and with clock-accurate timing from the synchronizing impulse, paging signals, as separately selected for each of the multitudes, each modulated with a distinguishing frequency for each of the multitudes for which that signal has been chosen;

said paging receivers each including a radio receiver, clock-accurate connection timing means, modulation discrimination means, and alert means, and relay means for activating the alert means, connected under control of the connection timing means, and subject to the modulation discrimination means, to be activated in response to the output of the radio receiver when a pulse is received with the correct distinguishing frequency and the correct timing after the synchronizing pulse for paging the particular receiver;

the sending station including a keyboard for each multitude for paging any paging receiver of that multitude, while another keyboard is causing selected paging from its multitude.

18. A radio paging system including multitudes of selective radio paging receivers tuned to a common carrier wave but with each multitude discriminative for a different distinguishing modulation frequency, and a radio sending station for selectively paging any one thereof;

the sending station including radio sending means, synchronizing means for causing the sending means to send a synchronizing impulse modulated by a frequency to start a paging cycle, and including paging signal means for causing the sending means to send, during each cycle and with clock-accurate timing from the synchronizing impulse, paging signals, as separately selected for each of the multitudes, each modulated with a distinguishing frequency for each of the multitudes for which that signal has been chosen;

said paging receivers each including a radio receiver, clock-accurate connection timing means, modulation discrimination means, and alert means, and relay means for activating the alert means, connected under control of the connection timing means, and subject to the modulation discrimination means, to be activated in response to the output of the radio receiver when a pulse is received with the correct distinguishing frequency and the correct timing after the synchronizing pulse for paging the particular receiver;

the sending station including a keyboard for each multitude for paging any paging receiver of that multitude, while another keyboard is causing selected paging from its multitude, and each paging receiver being responsive to a single paging pulse, whereby all of the paging receivers of a plurality of multitudes, and selectively any smaller number, could be called in one cycle.

19. A radio paging system including multitudes of selective radio paging receivers tuned to a common carrier wave but with each multitude discriminative for a different distinguishing modulation frequency, and a radio sending station for selectively paging any one thereof;

the sending station including radio sending means, synchronizing means for causing the sending means to send a synchronizing impulse modulated by a frequency to start a paging cycle, and including paging signal means for causing the sending means to send, during each cycle and with clock-accurate timing from the synchronizing impulse, paging signals, as separately selected for each of the multitudes, each modulated with a distinguishing frequency for each of the multitudes for which that signal has been chosen;

said paging receivers each including a radio receiver, clock-accurate connection timing means, modulation discrimination means, and alert means, and relay means for activating the alert means, connected under control of the connection timing means, and subject to the modulation discrimination means, to be activated in response to the output of the radio receiver when a pulse is received with the correct distinguishing frequency and the correct timing after the synchronizing pulse for paging the particular receiver;

said sending station being capable of operating through a series of cycles independently of separate manual starting steps.

20. A radio paging system including a multitude of personally portable selective radio paging receivers and a radio sending station for selectively paging any one thereof;

the sending station including radio sending means, a rotary signal cycling switch having a multitude of contacts closed in succession, each momentarily, means for driving the switch with clock-accuracy through a series of revolutions without separate restarting steps, means associated with the switch to send a synchronizing impulse modulated by a combination of two frequencies, and with selected timing thereafter by preselection of connections to the contacts, to send a paging signal modulated with another combination of two frequencies;

said paging receivers each including a radio receiver having an audio-class output reflecting said frequencies, a clockworks-driven signal-synchronized rotary switch having an individual contact disposition different from other paging receivers of the same frequency discrimination, and alert means, and means for discriminating both of said frequency combinations including vibrating armature relay means connected under control of its associated rotary switch to be energized by the output of the radio receiver when a pulse is received with correct timing after the synchronizing pulse for paging the particular receiver.

21. A radio paging system including a multitude of personally portable selective radio paging receivers and a radio sending station for selectively paging any one thereof;

the sending station including radio sending means, a rotary signal cycling switch having a multitude of contacts closed in succession, each momentarily, means for driving the switch with clock-accuracy through a series of revolutions without separate restarting steps, means associated with the switch to send a synchronizing impulse modulated by a combination of two frequencies, and with selected timing thereafter by preselection of connections to the contacts, to send a paging signal modulated with another combination of two frequencies;

said paging receivers each including a radio receiver having an audio-class output reflecting said frequencies, a clockworks-driven signal-synchronized rotary switch having an individual contact disposition different from other paging receivers of the same frequency discrimination, and alert means, and means for discriminating both of said frequency combinations including vibrating armature relay means connected under control of its associated rotary switch to be energized by the output of the radio receiver when a pulse is received with correct timing after the synchronizing pulse for paging the particular receiver;

said rotary switches each having contact dimensions of that switch causing it to remain closed for a duration which, when added to the actual spacing of impulse centers approximately equals the sum of three durations, that of radio receiver output pulse and the durations representative of minimum pulse time required for safe operation of said relay and maximum pulse time which will safely leave said relay unactuated, whereby substantially maximum phase discrepancy between contact closing and impulse times will be tolerated.

22. A radio paging system including a multitude of personally portable selective radio paging receivers and a radio sending station for selectively paging any one thereof;

the sending station including radio sending means, a rotary signal cycling switch having a multitude of contacts closed in succession, each momentarily, means for driving the switch with clock accuracy through a series of revolutions without separate restarting steps, means associated with the switch to send a synchronizing impulse modulated by a combination of two frequencies, and with selected timing thereafter by preselection of connections to the contacts, to send a paging signal modulated with another combination of two frequencies;

said paging receivers each including a radio receiver having an audio-class output reflecting said frequencies, a clockworks-driven signal-synchronized rotary switch having an individual contact disposition different from other paging receivers of the same frequency discrimination, and alert means, and means for discriminating both of said frequency combinations including vibrating armature relay means connected under control of its associated rotary switch to be energized by the output of the radio receiver when a pulse is received with correct timing after the synchronizing pulse for paging the particular receiver;

said rotary switches each having a number of successive contacts representative of approximately the minimum spacing of impulse centers for effectively and reliably actuating the vibrating armature relays under control of the signal-synchronized rotary switch; and each having contact dimensions of that switch causing it to remain closed for a duration which, when added to the actual spacing of impulse centers approximately equals the sum of three durations, that of radio receiver output pulse and the durations representative of minimum pulse time required for safe operation of said relay and maximum pulse time which will safely leave said relay unactuated, whereby substantially maximum phase discrepancy between contact closing and impulse times will be tolerated.

23. A radio paging system including a multitude of selective radio paging receivers and a radio sending station for selectively paging any one thereof;

the sending station including radio sending means, a signal cycling switch having a multitude of switch units closed in succession, each momentarily, means for driving the switch with clock accuracy, means associated with the switch to send a synchronizing impulse modulated by a frequency, and with selected timing thereafter by preselection of switch unit connections, to send paging signals each modulated with a frequency;

said paging receivers each including a radio receiver having an audio-class output reflecting said frequencies, a clockworks-driven signal synchronized rotary switch having an individual contact disposition different from the other paging receivers of the same frequency discrimination, clock-accurate connection timing means, and alert means, and frequency discrimination means including vibrating armature relay means connected under control of its associated rotary switch to be energized by the output of the radio receiver when a pulse is received with correct timing after the synchronizing pulse for paging the particular receiver;

said rotary switches each having contact dimensions of that switch causing it to remain closed for a duration which, when added to the actual spacing of impulse centers approximately equals the sum of three durations, that of radio receiver output pulse and the durations representative of minimum pulse time required for safe operation of said relay and maximum pulse time which will safely leave said relay unactuated, whereby substantially maximum phase discrepancy between contact closing and impulse times will be tolerated;

said means to send a synchronizing impulse including means terminating said impulse before such a late start of the effective operation of the signal-synchronized rotary switch could cause a greater phase discrepancy.

24. A radio paging system including multitudes of selective radio paging receivers and a radio sending station for selectively paging any one thereof;

the sending station including radio sending means, synchronizing means for causing the sending means to send a synchronizing impulse modulated by a combination of two audio-class frequencies, and including paging signal means for causing the sending means to send paging signals each modulated with another combination of two audio-class frequencies, with clock-accurate timing from the synchronizing impulse;

a multitude of paging receivers each including a radio receiver having an audio-class output reflecting said frequencies, clock-accurate connection timing means, and alert means, and vibrating armature relay means for discriminating between said frequency combinations connected under control of the connection timing means to be energized by the output of the radio receiver when a pulse is received with correct timing after the synchronizing pulse for paging the particular receiver;

said sending station also including means for sending simultaneously with the foregoing paging impulses separately chosen paging impulses modulated with still another combination of frequencies for selectively paging another multitude of radio paging receivers responsive in the same manner on a timed basis to the paging impulses modulated by said last-named combination of frequencies;

said means for causing impulses having one frequency common to all thereof.

25. A radio paging system including multitudes of selective radio paging receivers and a radio sending station for selectively paging any one thereof;

the sending station including radio sending means, synchronizing means for causing the sending means to send a synchronizing impulse modulated by a combination of two audio-class frequencies, and including paging signal means for causing the sending means to send paging signals each modulated with another combination of two audio-class frequencies, with clock-accurate timing from the synchronizing impulse;

a multitude of paging receivers each including a radio receiver having an audio-class output reflecting said frequencies, clock-accurate connection timing means, and alert means, and vibrating armature relay means for discriminating between said frequency combinations connected under control of the connection timing means to be energized by the output of the radio receiver when a pulse is received with correct timing after the synchronizing pulse for paging the particular receiver;

said sending station also including means for sending simultaneously with the foregoing paging impulses separately chosen paging impulses modulated with still another combination of frequencies for selectively paging another multitude of radio paging receivers responsive in the same manner on a timed basis to the paging impulses modulated by said last-named combination of frequencies;

said means for causing impulses having one frequency common to all thereof;

and voice transmission means for causing sending means to send with voice modulation free of said common frequency.

26. The combination of:

a radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the speed contact in a predetermined position and to start its drive by said clockwork means in response to an output impulse from the radio receiver;

and a radio sender which in normal use operates continuously through a series of cycles each including a starting output impulse following a synchronizing pause in its sending at the end of each revolution of the rotary contacting device, such pause occupying only a small fraction of the time consumed by said revolution, the start of the rotary contacting device after said pause being initiated by a pulse from the radio sender which is of different character from signal pulses from the same source.

27. A radio paging receiver including a radio receiver having an audio-class output, clock-accurate connection timing means, and alert means, and vibrating armature relay means for activating the alert means, connected under control of the connection timing means to be energized by the output of the radio receiver when a pulse is received with correct modulation frequency and correct timing after a synchronizing pulse for paging the particular receiver, the connection timing means otherwise maintaining the relay means de-energized during the reception of paging signals, so that no false paging will result from the decay time of the relay means even if a paging impulse intended for another paging receiver is received immediately preceding said correct timing;

said vibrating relay means requiring a combination of two modulation frequencies for its actuation.

28. A radio paging receiver including a radio receiver having an audio-class output, clock-accurate connection timing means, and alert means, and vibrating armature relay means for activating the alert means, connected under control of the connection timing means to be energized by the output of the radio receiver when a pulse is received with correct modulation frequency and correct timing after a synchronizing pulse for paging the particular receiver, the connection timing means otherwise maintaining the relay means de-energized during the reception of paging signals, so that no false paging will result from the decay time of the relay means even if a paging impulse intended for another paging receiver is received immediately preceding said correct timing.

29. A radio paging receiver including a radio receiver having an audio-class output, clock-accurate connection timing means, and alert means, and vibrating armature relay means for activating the alert means, connected under control of the connection timing means to be energized by the output of the radio receiver when a pulse is received with correct modulation frequency and correct timing after a synchronizing pulse for paging the particular receiver, the connection timing means otherwise maintaining the relay means de-energized during the reception of paging signals, so that no false paging will result from the decay time of the relay means even if a paging impulse intended for another paging receiver is received immediately preceding said correct timing;

said vibrating armature relay means having three reeds of different frequency connected in two series circuits, means in one of the circuits for synchronizing the connection timing means, and means in the other circuit comprising at least a part of means for activating the alert means.

30. A radio paging receiver including a radio receiver having an audio-class output, clock-accurate connection timing means, and alert means, and vibrating armature relay means for activating the alert means, connecting under control of the connection timing means to be energized by the output of the radio receiver when a pulse is received with correct modulation frequency and correct timing after a synchronizing pulse for paging the particular receiver, the connection timing means otherwise maintaining the relay means de-energized during the reception of paging signals, so that no false paging will result from the decay time of the relay means even if a paging impulse intended for another paging receiver is received immediately preceding said correct timing;

said vibrating relay means having three reeds of different frequency connected in two series circuits, means in one of the circuits for synchronizing the connection timing means, and means controlled by the other circuit in response to a plurality of separate actuations of its vibrating relay reeds between successive operations of the synchronizing means to activate the alert means.

31. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

the clockwork means being powered by means entirely self-contained by the portable paging receiver, normally free during operation from external power systems and said receiver having frequency responsive means responsive to a plurality of frequencies for selecting on a plural frequency basis between radio signals modulated by different combinations of frequencies.

32. A radio paging receiver for personal portability including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

the clockwork means being powered by means entirely self-contained by the portable paging receiver, normally free during operation from external power systems;

and a clutch-brake unit stable without power consumption in one condition for connecting said rotary contact device to the clockwork means to be driven by it, and in another condition releasing the rotary contact device from the clockwork means and holding it against motion.

33. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

the clockwork means being powered by means entirely self-contained by the portable paging receiver, normally free during operation from external power systems;

a clutch-brake unit for alternately connecting said rotary contact device to the clockwork means to be driven by it, and holding it against motion; said clutch-brake unit being bi-stable, said receiver including stop and go electromagnet means for shifting the clutch-brake unit from either stable position to the other, with energization for only a very small part of the switching cycle.

34. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

the clockwork means being powered by a spring, and means is provided for winding the spring occasionally by transitory engagement with externally applied power, said rotary contact device having at least 30 paging contact positions, and the dimensions of the paging and selector contacts being such that substantially throughout the cycle of the sweep contact, other than at a control portion thereof, the sweep contact is in a position to engage a paging contact, if such paging contact is in the nearest paging contact position, and said receiver having frequency responsive means for selecting on a plural frequency basis between radio signals modulated by different combinations of frequencies, and a clutch-brake unit for alternately connecting said rotary contacting device to the clockwork means to be driven by it, and holding it against motion; said clutch-brake unit being bi-stable, stop and go electromagnet means for shifting the clutch-brake unit from either stable position to the other, and said paging radio receiver including means for interrupting current to said electromagnet means upon its shifting the clutch-brake unit to either position.

35. A radio paging receiver including a radio receiver for personal portability, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

including an electromagnet for actuating the stopping means, a stop circuit for actuating said electromagnet including a battery forming part of the portable receiver, means which quickly interrupts said stop circuit as the rotary contacting device is brought to rest, and additional means to prepare the stop circuit for the next stop.

36. A radio paging receiver for personal portability including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

including an electromagnet for actuating the stopping means, a stop circuit for actuating said electromagnet including a battery forming part of the portable receiver, means which quickly interrupts said actuating circuit as the rotary contacting device is brought to rest, and additional means including a preparatory contact which is engaged by the sweep contact to prepare the stop circuit for the next stop.

37. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

the motion of the rotary contacting device being controlled by a stop electromagnet coil and a go electromagnet coil, a clutch-brake oppositely actuated by said electromagnet coils and including magnet means which by residual magnetism hold the clutch-brake in opposite positions and also supply the driving action and the holding seizures, respectively.

38. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

including an electromagnet for actuating the stopping means, a stop circuit for actuating said electromagnet including a battery forming part of the portable receiver, means which quickly interrupts said actuating circuit as the rotary contacting device is brought to rest, and additional means to prepare the stop circuit for the next stop; and in which the signal means includes a manually spring-wound buzzer tripped into operation by a momentary pulse from a battery forming part of the portable receiver; said signal means being incapable of further battery drain once it has been tripped.

39. A radio paging receiver including a radio receiver, a rotary contacting device having a series of paging contact positions, paging contact means adapted to be selectively made functional at any paging conctact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio reecivér, and said paging receiver being characterized further by:

the signal means including a manually spring-wound buzzer tripped into operation by a momentary pulse from a battery forming part of the portable receiver and being incapable of further battery drain once it has been tripped.

40. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

including an electromagnet for actuating the stopping means, a stop circuit for actuating said electromagnet including a battery and which is closed by a contact of the switching device at the end of each switching cycle.

41. A radio paging receiver for personal portability including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

having a battery forming part of the portable receiver, and the means to stop the rotary contacting device including an electromagnet supplied with current from said battery, and said receiver including means making said stopping means incapable, after its operation, of preventing the effective operation of the start means.

42. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

having a battery forming part of the portable receiver and in which the means to stop the rotary contacting device includes an electromagnet supplied with current from said battery, and said receiver includes means making said stopping means incapable, after its operation, of preventing the effective operation of the start means; and said starting means being selectively responsive to require a starting pulse of different character from ordinary pulses to which the signal means is responsive.

43. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

the means to start the rotary contacting device being selectively responsive to require for its starting operation a pulse received and detected by the radio receiver but which is of different character from the pulses detected by the same receiver which serves to actuate the signal means.

44. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

the means to start and stop action of the rotary contacting device including a start electromagnet and a stop electromagnet, said stop electromagnet being energized from a battery through the rotary contacting device energizing a stop contact thereof by which said stopping action is initiated invariably at the end of each switching cycle and without the aid of any pulses from the radio receiver, and said receiver including means for limiting said stopping current to a short time and making the stop electromagnet incapable, after its operation, of preventing effective operation of the start electromagnet by current initiated by a starting pulse received from the sender station.

45. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

including a circuit for actuating the start means, and including a frequency-responsive means responsive to the output of the radio receiver and controlling said circuit to prevent current through it except for when the frequency responsive means is subjected to a starting pulse of its required frequency from the radio receiver; said paging receiver having characteristics requiring that said starting pulse be of different character than the pulses which actuate the signal means.

46. A radio paging receiver including a radio receiver, a rotary contacting device having a series of paging contact positions, paging contact means adapted to be selectively made functional at any paging contact position, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a functional paging contact, to signal receipt of a page call for this paging receiver; said paging receiver including means to stop the rotary contacting device with the sweep contact in a predetermined position and to start its drive by said clockwork means in response to an output impulse from the radio receiver, and said paging receiver being characterized further by:

a single contact of the rotary contacting device being used for starting and stop actuation of the stop and start means; and said receiver including means effective after the stop actuation to enable the starting actuation to act successfully to cause a new complete revolution of the contacting device after each stop.

47. A radio paging receiver for personal portability including a radio receiver, a rotary contacting device having a series of paging contact positions, paging contact means selectively located among said positions, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a paging contact, to signal receipt of a page call for this paging receiver;

said clockwork means being a type inherently subject to cumulative inaccuracy, but said rotary contacting device being maintained adequately synchronized with remote sending equipment, totally unconnected to the paging receiver, by having the dimensions of the sweep contact and the functional paging contact such that if functional paging contacts are in two adjacent positions the closed condition of the sweep contact with one endures substantially until that with the other begins, the paging receiver including means to stop the rotary contacting device precisely positioned and start it in response to an output impulse from the radio receiver in a timed relationship corresponding to centering of the sweep contact with respect to a paging contact position in predetermined phase relationship to subsequent output impulses during the switching cycle;

the means to stop and start including electromagnetic means and a battery therefor within the paging receiver, and means for disconnecting the electromagnetic means from the battery promptly after initial energization of the electromagnetic means.

48. A radio paging receiver including a radio receiver, alert means, and means for actuating the alert means in response to a particular output of the radio receiver including in a signal-synchronized rotary switch for signal-synchronized selective paging and including a circle of contacts, a brush wiping the contacts and means for producing relative movement of the brush and timed stops thereof, including a drive-shaft, a clockwork device constantly driving a clock shaft on the drive shaft axis:

an electromagnetic clutch-brake including two magnet structures on said axis, one a permanent magnet secured to the clock shaft, and the other a fixed retentive electromagnet including magnetic circuit structure and coil means therefor, a common armature means carried by the drive shaft and shiftable along the common axis and arranged to be drawn by either magnet structure into engagement therewith and away from the other magnet structure;

circuitry associated with the coil means for energizing said magnetic structure with one polarity with sufficient strength to pull the armature means from contact with the permanent magnet structure; said magnetic circuit structure having sufficient retentivity to retain the armature after termination of said polarity energization by said circuitry, and circuitry for energizing the coil means with reverse polarity of a strength to reduce the flux of said magnetic structure sufficiently to release the armature means and allow it to be drawn away by the permanent magnet structure.

49. A radio paging receiver including a radio receiver, alert means, and means for actuating the alert means in response to a particular output of the radio receiver including a signal-synchronized rotary switch for signal-synchronized selective paging and including a circle of contacts, a brush wiping the contacts and means for producing relative movement of the brush and timed stops thereof, including a drive-shaft, a clockwork device constantly driving a clock shaft on the drive shaft axis:

an electromagnetic clutch-brake including two magnet structures on said axis, one a permanent magnet secured to the clock shaft, and the other a fixed retentive electromagnet including magnetic circuit structure and coil means therefor, a common armature means carried by the drive shaft and arranged to be drawn by the permanent magnet structure into engagement therewith;

circuitry associated with the coil means for energizing said magnetic structure with one polarity with sufficient strength to release the armature means from the permanent magnet structure; said magnetic circuit structure having sufficient retentivity to retain the armature released from the permanent magnet structure after termination of said polarity energization by said circuitry, and circuitry for energizing the coil means with reverse polarity of a strength to reduce the flux of said magnetic structure sufficiently to release the armature means and allow it to be drawn by the permanent magnet structure.

50. A radio paging receiver including a radio receiver, alert means, and means for actuating the alert means in response to a particular output of the radio receiver including a signal-synchronized rotary switch for signal-synchronized selective paging and including a circle of contacts, a brush wiping the contacts and means for producing relative movement of the brush and timed stops thereof, including a drive-shaft, a clockwork device constantly driving a clock shaft on the drive shaft axis:

a magnetic clutch including a permanent magnet structure secured to one shaft on said axis, an armature means carried by the other shaft and normally drawn by the permanent magnet structure into clinging engagement therewith without the consumption of power, and means for releasing the clutch and thereby releasing the rotary switch from the clockwork device comprising a coil in magnetic association with said armature and a circuit for briefly energizing the coil to counter the permanent magnet and release its said clinging engagement.

51. A radio paging receiver for personal portability including a radio receiver, a rotary contacting device having a series of paging contact positions, paging contact means selectively located among said positions, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a paging contact, to signal receipt of a page call for this paging receiver; said paging receiver including means to stop the rotary contacting device with the sweep contact in a predetermined position and to start its drive by said clockwork means in response to an output impulse from the radio receiver;

said clockwork means being constantly and firmly coupled to the switching device and including a drive means within the receiver and which is completely self-sufficient, and a balance wheel;

and said paging receiver including as part of the stop and start means, means for engaging the balance wheel to stop it, and electromagnetic means for releasing the balance wheel and starting the clockwork means.

52. A radio paging receiver for personal portability including a radio receiver, a rotary contacting device having a series of paging contact positions, paging contact means selectively located among said positions, a sweep contact adapted for relative movement through a switching cycle including the entire series of paging contact positions clockwork means for driving the rotary contacting device, signal means responsive at least indirectly to conditions, including the occurrence of a predetermined output impulse from the radio receiver when the sweep contact is on a paging contact, to signal receipt of a page call for this paging receiver; said paging receiver including means to stop the rotary contacting device with the sweep contact in a predetermined position and to start its drive by said clockwork means in response to an output impulse from the radio receiver;

the clockwork means being constantly and firmly coupled to the switching device and including a drive means within the receiver and which is completely self-sufficient, and a balance wheel;

and said paging receiver including as part of the stop and start means, means for engaging the balance wheel to stop it, and electromagnetic means for releasing the balance wheel and starting the clockwork means; said means for engaging and releasing the balance wheel operable by brief pulses independently of continued electromagnetic energization.

53. A radio paging receiver for personal portability including a radio receiver, a rotary contacting device having a series of paging contact positions, paging contact means selectively located among said positions, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a paging contact, to signal receipt of a page call for this paging receiver; said paging receiver including means to stop the rotary contacting device with the sweep contact in a predetermined position and to start its drive by said clockwork means in response to an output impulse from the radio receiver;

the clockwork means being constantly and firmly coupled to the switching device and including a drive means within the receiver and which is completely self-sufficient, and a balance wheel;

and said paging receiver including as part of the stop and start means, means for engaging the balance wheel to stop it, and electromagnetic means for releasing the balance wheel and starting the clockwork means; said means for engaging and releasing the balance wheel being operable by brief pulses independently of continued electromagnetic energization;

the means for engaging the balance wheel comprising a projection rotating wtih the balance wheel, an intercepting member, means to move the intercepting member into the path of the projection at the end of each switching cycle, the construction and the position of the intercepting member in said path being such as to stop the balance wheel only as it is remote from the midpoint in its swing; the starting means shifting away the intercepting member from the projection to start the balance wheel by its stored energy.

54. A radio paging receiver for personal portability including a radio receiver, a rotary contacting device having a series of paging contact positions, paging contact means selectively located among said positions, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a paging contact, to signal receipt of a page call for this paging receiver; said paging receiver including means to stop the rotary contacting device with the sweep contact in a predetermined position and to start its drive by said clockwork means in response to an output impulse from the radio receiver;

the clockwork means being constantly and firmly coupled to the switching device and including a drive means within the receiver and which is completely self-sufficient, and a balance wheel;

and said receiver including as part of the stop and start means, means for engaging the balance wheel to stop it, and means responsive to the radio receiver for releasing the balance wheel and starting the clockwork means; said means for engaging the balance wheel being such as to stop the balance wheel only as it is remote from the midpoint in its swing.

55. A radio paging receiver for personal portability including a radio receiver, a rotary contacting device having a series of paging contact positions, paging contact means selectively located among said positions, a sweep contact adapted for relative movement through a switching cycle including the entire series of paging contact positions, clockwork means for driving the rotary contacting device, signal means responsive at least indirectly to conditions, including the occurrence of a predetermined output impulse from the radio receiver when the sweep contact is on a paging contact, to signal receipt of a page call for this paging receiver; said paging receiver including means to stop the rotary contacting device with the sweep contact in a predetermined position and to start its drive by said clockwork means in response to an output impulse from the radio receiver;

the clockwork means being constantly and firmly coupled to the switching device and including a drive means within the receiver and which is completely self-sufficient, and a balance wheel;

and said paging receiver including as part of the stop and start means, means for engaging the balance wheel to stop it, and means responsive to the radio receiver for releasing the balance wheel and starting the clockwork means; said means for engaging the balance wheel being such as to stop the balance wheel only as it is remote from the midpoint in its swing and said means for releasing the balance wheel being controlled by a circuit which is energized only momentarily.

References Cited by the Examiner

UNITED STATES PATENTS

| | | | |
|---|---|---|---|
| 2,128,242 | 8/1930 | Graham et al. ______ | 178—53.1 |
| 2,436,824 | 3/1948 | Potter _____________ | 340—164 |
| 2,899,547 | 8/1959 | Crow et al. _________ | 340—311 |

NEIL C. READ, *Primary Examiner.*

H. I. PITTS, *Assistant Examiner.*